US007292293B2

(12) United States Patent
Seki et al.

(10) Patent No.: US 7,292,293 B2
(45) Date of Patent: Nov. 6, 2007

(54) COLOR FILTER SUBSTRATE AND MANUFACTURING PROCESS THEREFOR, LIQUID CRYSTAL DEVICE AND MANUFACTURING PROCESS THEREFOR, AND ELECTRONIC APPARATUS

(75) Inventors: Takumi Seki, Nagano-ken (JP); Eiji Okamoto, Nagano-ken (JP); Keiji Takizawa, Nagano-ken (JP)

(73) Assignee: Seiko Epson Corporation, JPX ( * ) Notice: Subject to any disclaimer, the term of this patent is extended or adjusted under 35 U.S.C. 154(b) by 298 days.

(21) Appl. No.: 10/641,426

(22) Filed: Aug. 15, 2003

(65) Prior Publication Data
US 2004/0032549 A1    Feb. 19, 2004

Related U.S. Application Data

(62) Division of application No. 09/508,842, filed as application No. PCT/JP99/03838 on Jul. 15, 1999, now Pat. No. 6,633,353.

(30) Foreign Application Priority Data
Jul. 17, 1998  (JP) .............................. 10-203628

(51) Int. Cl.
*G02F 1/1335* (2006.01)
(52) U.S. Cl. ...................... 349/106; 349/113
(58) Field of Classification Search ............ 349/106, 349/113–114, 138
See application file for complete search history.

(56) References Cited

U.S. PATENT DOCUMENTS

| | | | |
|---|---|---|---|
| 4,519,679 A * | 5/1985 | Horikiri et al. ............ 349/106 |
| 5,146,355 A   | 9/1992 | Prince et al. ............... 349/71 |
| 5,220,444 A * | 6/1993 | Mitsui et al. ............... 349/113 |
| 5,940,154 A * | 8/1999 | Ukita et al. ................. 349/113 |
| 6,266,108 B1  | 7/2001 | Bao et al. .................... 349/63 |
| 6,552,767 B1* | 4/2003 | Kaneko ....................... 349/119 |
| 6,621,543 B2* | 9/2003 | Moon .......................... 349/115 |

(Continued)

FOREIGN PATENT DOCUMENTS

JP        4-40421        2/1992

(Continued)

OTHER PUBLICATIONS

Examination Results corresponding to Japanese Application No. 2000-560483.

*Primary Examiner*—Toan Ton
(74) *Attorney, Agent, or Firm*—Harness, Dickey & Pierce, P.L.C.

(57) ABSTRACT

In a dark environment, light emitted by a fluorescent tube 301 enters a liquid crystal panel by a light guide plate 302, is transmitted through a transflective electrode 102 after passing through a polarizer 114 and a retardation plate 113, and is introduced into a liquid crystal layer 50 following coloration of light by a color filter 104. The light introduced into the liquid crystal layer 50 is emitted at an observation side of the liquid crystal panel through the retardation plate 213 and the polarizer 214 sequentially. On the other hand, in a bright environment, light from the observation side passes through the polarizer 214 and the liquid crystal layer 50, and is reflected at the transflective electrode 102 following coloration of light by the color filter 104, whereby the light is emitted at the observation side.

5 Claims, 14 Drawing Sheets

U.S. PATENT DOCUMENTS 6,798,485 B2 * 9/2004 Date et al. .................. 349/153
6,803,980 B2 * 10/2004 Funahata et al. ........... 349/113

FOREIGN PATENT DOCUMENTS

| JP | 4-86601 | 3/1992 |
| JP | 05-158029 | 6/1993 |
| JP | 06-265879 | 9/1994 |
| JP | 9-209156 | 8/1997 |
| JP | 10197860 | 7/1998 |
| JP | 11002807 | 1/1999 |
| JP | 11-52366 | 2/1999 |
| JP | 11167107 | 6/1999 |

* cited by examiner

COLOR FILTER SUBSTRATE AND MANUFACTURING PROCESS THEREFOR, LIQUID CRYSTAL DEVICE AND MANUFACTURING PROCESS THEREFOR, AND ELECTRONIC APPARATUS

CROSS REFERENCE TO RELATED APPLICATION

This application is a divisional of U.S. application Ser. No. 09/508,842 filed Jul. 11, 2000 now U.S. Pat. No. 6,633,353 which is hereby incorporated by reference.

TECHNICAL FIELD

The present invention relates to a color filter substrate having a colored layer formed on a metal and to a manufacturing process therefor. More particularly, the present invention relates to a liquid crystal device using the above substrate and to a manufacturing process therefor, and relates to an electronic apparatus using the above device.

BACKGROUND ART

As is well known, liquid crystal devices do not themselves emit light; instead, they produce displays or the like simply by changing the paths of light. Therefore, all liquid crystal devices necessarily have some type of arrangement for directing light into panels. In view of this, liquid crystal devices are far different from other display devices, such as electroluminescent displays and plasma displays. A liquid crystal device in which light incident from a light source or the like disposed at a rear side of a panel is emitted to an observing side after passing through the panel is called a transmissive type, and a liquid crystal device in which ambient light incident from an observing side is emitted to an observing side by reflection by a panel, is called a reflective type.

In reflective type devices, the amount of ambient light incident from the observing side is not large compared to light incident from a light source disposed at a rear side of a panel. In addition, reflective type devices have high attenuation of light in each part thereof because, when the light is reflected, the light retraces its path through the panel, so that light emitted to an observing side is less than that in transmissive types. Accordingly, reflective type devices have a problem that display screens thereof are generally darker compared to transmissive type devices.

On the other hand, reflective type devices have advantages such as being able to produce a display without a light source, which consumes large amount of electric power, being highly visible outdoors even in bright light, and the like. Hence, in some cases, the above advantages of reflective type devices overcome problems therein. Consequently, there is an increasing demand for reflective type liquid crystal devices for portable electronic apparatuses; however, a substantial problem remains in that when there is practically no ambient light, users cannot see the display of reflective type devices. A so-called "transflective liquid crystal device" is proposed as one solution to overcome this problem. In a bright environment, the liquid crystal device mainly uses reflection of ambient light, similar to that used in ordinary reflective type devices. However, in a dark environment, the transmissive type device is additionally used by lighting a light source disposed on a rear side of a panel, and therefore the device display can be seen in either situation. Moreover, concomitant with a recent demand for color displays for portable electronic devices, office automation apparatuses, and the like, color displays in transflective type liquid crystal devices are required in many cases.

A transflective liquid crystal device capable of providing a color display is described in, for example, Japan Unexamined Patent Application Publication No. 7-318919. The liquid crystal device which is disclosed in the above unexamined patent application, is provided inside a liquid crystal layer with pixel electrodes which also serve as a transflective film and has an arrangement for producing a color display. In the above arrangement, a color display is produced by coloring light by birefringent effects of a liquid crystal layer and a retardation film, and by polarization effects of polarizers provided at an observing side and at a rear side of a liquid crystal panel. Since the transflective film is provided inside the liquid crystal layer in the arrangement described above, double images, blurred display, and the like caused by parallax are avoided, and superior bright colored light can be obtained compared to an arrangement having a transflective film outside a liquid crystal layer.

DISCLOSURE OF THE INVENTION

However, the liquid crystal device described above has a problem of poor color reproducibility because light coloration is produced by birefringent effects and polarization effects.

The present invention was made taking the problem described above into consideration. A first object of the present invention is to provide a transflective or a reflective liquid crystal device with improved color reproducibility. As described in the above unexamined patent application, a transflective film is generally composed of aluminum or an aluminum alloy having aluminum as a primary component. When a colored layer, such as a color filter, a shading layer, or the like, is directly formed on the transflective film, aluminum is deteriorated during a forming process, and reflection characteristics may be seriously affected. When the colored layer is formed by an etching method, for example, a surface of the aluminum may be damaged by an etching solution. In addition, in some cases when the colored layer is formed by a color resist method, a surface of the aluminum may be damaged when the color resist is developed.

Accordingly, a second object of the present invention is to provide a color filter substrate, a liquid crystal device, and a manufacturing method therefor, in which, during a forming process for the colored layer, damage or deterioration of the aluminum, which is used as a metallic film for the transflective film and the reflective electrode, is prevented by a simple process.

To achieve the first object described above, the color filter substrate of the present invention, which is to be applied to the liquid crystal device, is a color filter substrate having a metallic film provided between the substrate and a colored layer, in which the metallic film and the colored layer are separated by a protective film provided between the metallic film and the colored layer.

According to the present invention, since the metallic film and the colored layer are separated by the protective film, the surface of the metallic film is not deteriorated when the colored layer is formed. Hence, a color filter substrate having good reflection characteristics at the metallic film is obtained.

An oxide film of the metallic film may be used as the protective film. In this case, an oxide film of the metallic film is preferably an anodized film. The reasons for this are that an anodizing method can easily control the thickness of the oxide film and form a dense oxide film having fewer defects such as pinholes. In addition, the colored layer may be formed by an electrodeposition method with proper thickness control.

As other examples of the protective films, oxides other than the metal oxide described above, organic dielectric films, and nitrides may be used. Oxides other than the metal oxide includes silicon oxides such as $SiO_2$, the organic dielectric films include acrylic resins, and the nitrides include silicon nitrides, typically $Si_3N_4$. When an oxide other than the oxides of the metallic films is used as a protective film, reflectance deterioration can be suppressed because of a low refractive index. When an organic dielectric film is employed, a protective film can be easily formed by a method such as a spin coat method or a roll coat method. When a nitride is used as a protective film, an advantage is to suppress reflectance deterioration because of low refractive index.

The protective film may be formed by optionally combining two or more films among the above oxide films of the metal, an oxide films other than the above, the organic dielectric films, and the nitride films.

A metallic film including a primary component, such as aluminum, silver, chromium or the like, is used as the metallic film. When a metallic film including aluminum as a primary component is used, a metallic film having a high reflectance is obtained by using an inexpensive material. In addition, since an oxide film can be obtained from aluminum by anodization, a protective film composed of the oxide film can be easily formed. A preferable aluminum content in the metallic film is 85 weight percent or more. A metallic film having a very high reflectance is realized by a metallic film including silver as a primary component. A preferable silver content in the metallic film is 85 weight percent or more.

To achieve the first object described above, a method for manufacturing a color filter substrate of the present invention, which is to be applied to the liquid crystal device, is a method for manufacturing a color filter substrate having a metallic film provided between a substrate and a colored layer, comprising the steps of forming a protective film on the metallic film, and forming the colored layer on the protective film. In the method for manufacturing the color filter substrate, for the same reason as that in the color filter substrate described above, the surface of the metallic film is not deteriorated when the colored layer is formed. Hence, the color filter substrate having good reflection characteristics at the metallic film is realized. The step for forming the protective film includes a step for oxidizing the metallic film. Preferably, the metallic film is anodized. The reasons for this are that the anodizing method can easily control thickness of the oxide film and form a dense oxide film having fewer defects such as pinholes. In addition, the colored layer may be formed by an electrodeposition method with proper thickness control. Other matters not described here are similar to those described for the above color filter substrate.

The features of the liquid crystal device according to the present invention are that the liquid crystal device comprises a first substrate and a second substrate, a liquid crystal layer disposed between the first substrate and the second substrate, a metallic film disposed on the surface of the second substrate adjacent to the liquid crystal layer, which reflects incident light from the first substrate, and a colored layer provided above the surface of the metallic film adjacent to the liquid crystal layer, in which the metallic film and the colored layer are separated by a protective film provided therebetween. Since this liquid crystal device is provided with the color filter substrate, the surface of the metallic film is not deteriorated when the colored layer is formed. Hence, reflection characteristics are improved.

In the embodiment of this liquid crystal device, the protective film includes an oxide film of the metallic film. In this case, the oxide film of the metallic film is preferably an anodized film. According to this embodiment, an anodizing method can easily control the thickness of the oxide film and can form a dense oxide film having fewer defects such as pinholes.

Next, the features of the method for manufacturing the liquid crystal device according to the present invention will be described. The liquid crystal device comprises a first substrate and a second substrate, a liquid crystal layer disposed between the first and the second substrate, a metallic film formed on the surface of the second substrate adjacent to the liquid crystal layer, which reflects incident light from the first substrate, and a colored layer provided above the surface of the metallic film adjacent to the liquid crystal layer. The method for manufacturing the liquid crystal device comprises the steps of forming a protective film on the metallic film, and forming the colored layer on the protective film. Since this manufacturing method includes the method for manufacturing the color filter substrate described above, the surface of the metallic film is not deteriorated when the colored layer is formed. Hence, reflection characteristics are improved.

In the embodiment of this manufacturing method, the steps for forming the protective film includes a step for oxidizing the metallic film. Preferably, the metallic film is anodized. The reasons for this are that the anodizing method can easily control the thickness of the oxide film and can form a dense oxide film having fewer defects such as pinholes. In addition, the colored layer may be formed by an electrodeposition method with proper thickness control. Other matters not described here are similar to those described in the above color filter substrate and the manufacturing method therefor.

Features of an electronic apparatus according to the present invention will be described. The electronic apparatus is provided with a liquid crystal device as a display portion which comprises a first substrate and a second substrate, a liquid crystal layer disposed between the first and the second substrate, a metallic film formed on the surface of the second substrate adjacent to the liquid crystal layer, which reflects incident light from the first substrate, and a colored layer provided above the surface of the metallic film adjacent to the liquid crystal layer, in which the metallic film and the colored layer are separated by a protective film provided therebetween. Since this electronic apparatus is provided with the liquid crystal device described above, an electronic apparatus having superior image display can be realized.

A specific liquid crystal device according to the present invention, which achieves the first object and the second object, will be explained. First, to achieve the first object, a first liquid crystal device of the present invention comprises a first transparent substrate and a second transparent substrate, a liquid crystal layer disposed between the first substrate and the second substrate, a transparent electrode formed on the surface of the first substrate adjacent to the liquid crystal layer, a transflective electrode formed on the surface of the second substrate adjacent to the liquid crystal layer, and the colored layer formed on the upper surface of the transflective electrode.

According to the first liquid crystal device, in the transmissive display, incident light from the second substrate passes through the colored layer and the liquid crystal layer sequentially after being transmitted through the transflective electrode, and is then emitted at the first substrate side. Whereas, in the reflective display, incident light from the first substrate is reflected at the transflective electrode after passing through the liquid crystal layer and the colored layer sequentially, and is then emitted at the first substrate side after retracing its path through which the light passed. Consequently, in both the transmissive display and the reflective display, light is transmitted through the colored layer, so that the first object of improving color reproducibility can be achieved. In addition, the distance from the transflective electrode to the liquid crystal layer is short, since the transflective electrode is formed on the surface of the second substrate adjacent to the liquid crystal layer. Hence, in the reflective display, generation of double images and blurred display caused by parallax can be avoided.

In the liquid crystal device described above, a lighting unit such as a backlight may be provided at the second substrate at the side thereof opposite to the liquid crystal layer. When the lighting unit described above is provided, light from the lighting unit is transmitted through the transflective electrode, so that a bright display can be obtained in a dark environment by additionally functioning as a transmissive display.

When a metal, such as aluminum, silver, or chromium, is formed to have a thickness of approximately 15 to 20 nm and is used as the transflective electrode, a transflective film is obtained having a reflectance of approximately 85% and a transmittance of approximately 10%. When a metal having aluminum as a primary component is specifically used, inexpensive, high reflectance transflective electrode can be realized. When a metal having aluminum as a primary component is used, a preferable content thereof is 85% or more.

In the embodiment of the first liquid crystal device, a protective film is formed between the colored layer and the transflective electrode. According to this embodiment, since the colored layer and the transflective electrode are separated by the protective film, the second object of beforehand preventing damage and deterioration of aluminum used as the transflective electrode can be achieved by a simple process.

The protective film is preferably an anodized film of the metal constituting the transflective electrode. The reasons for that are that the anodizing method can easily control the thickness of the oxide film and can form a dense oxide film having fewer defects such as pinholes. In addition, the colored layer may be formed by a so-called "electrodeposition method" with proper thickness control.

As other examples of the protective films, oxide films other than the metal constituting the transflective electrode, nitride films, and organic dielectric films, may be used. The oxide films include silicon oxides such as $SiO_2$, and nitride films include silicon nitrides, typically $Si_3N_4$, both of which can be formed by chemical vapor deposition. The organic dielectric films include acrylic resins, which can be formed by a spin coat method or a roll coat method. Furthermore, the protective film may be formed by optionally combining two or more films among the oxide films of the metal constituting the transflective electrode, the oxide films other than above, the organic dielectric films, and the nitride films. Thus, the thickness of the protective film is reduced, so that deterioration of reflectance can be suppressed as much as possible.

In another embodiment of the first liquid crystal device, the transflective electrode is provided with an opening in the form of a slit, and the colored layer is formed in an area corresponding to that at which the slit is formed. According to this embodiment, in the transmissive display, light is transmitted through (passes through) a slit as well as passes through the colored layer and the liquid crystal layer sequentially, and is emitted at the first substrate side. Since the colored layer is formed in an area corresponding to that at which the slit is provided, light passing through the slit is colored by the colored layer, so that color reproducibility of the transmissive display can be improved.

Various driving methods for the first liquid crystal device may be employed, which include a passive matrix method and other methods such as an active matrix method. Among these, when the active matrix method is employed, the following embodiment may be considered. That is, in one embodiment employing the active matrix method for the first liquid crystal device, the transflective electrode also serves as a pixel electrode, and a switching element is connected to each pixel electrode described above. In this embodiment, since the transflective electrode also serves as a pixel electrode, and a switching element is connected to each pixel electrode, an ON pixel and an OFF pixel can be separated electrically by the switching element. Therefore, a liquid crystal device having superior contrast and response, and very fine display, can be easily achieved.

In another embodiment employing the active matrix method for the first liquid crystal device, the transparent electrode also serves as a pixel electrode, and a switching element is connected to each pixel electrode described above. According to this embodiment, since the transparent electrode also serves as a pixel electrode, and a switching element is connected to each pixel electrode, an ON pixel and an OFF pixel can be separated electrically by the switching element. Therefore, a liquid crystal device having superior contrast and response, and very fine display, can be easily achieved.

Various elements such as a thin film diode (TFD) and a thin film transistor (TFT) can be used as a switching element in these embodiments.

The first object can also be achieved by a first electronic apparatus provided with the first liquid crystal device described above. According to the first electronic apparatus, in both the transmissive display and the reflective display, various electronic apparatuses can be produced provided with the liquid crystal devices which have improved color reproducibility and no generation of double images and blurred display caused by parallax. Consequently, the electronic apparatus as described above can produce high quality display in a bright and a dark environment, regardless of the level of ambient light.

To achieve the first object described above, the second liquid crystal device of the invention comprises a first transparent substrate and a second transparent substrate, a liquid crystal layer disposed between the first and the second substrate, a first transparent electrode formed on the surface of the first substrate adjacent to the liquid crystal layer, a transflective film formed on the surface of the second substrate adjacent to the liquid crystal layer, a colored layer formed on the upper surface of the transflective electrode, and a second transparent electrode formed on the upper surface of the colored layer.

According to the second liquid crystal device, in the transmissive display, incident light from the second substrate passes through the colored layer, the second transparent electrode, and the liquid crystal layer sequentially after being transmitted through the transflective electrode, and is then emitted at the first substrate side. Whereas, in the reflective display, incident light from the first substrate is reflected at the transflective electrode after passing through the liquid crystal layer, the second transparent electrode, and the colored layer sequentially, and is then emitted at the first substrate side after retracing its path through which the light passed. Consequently, in both the transmissive display and the reflective display, light is transmitted through the colored layer, so that the improvement of color reproducibility can be achieved. Similar to the first liquid crystal device, the first object described above can be achieved. In addition, the distance from the transflective electrode to the liquid crystal layer is short, since the transflective electrode is formed on the surface of the second substrate adjacent to the liquid crystal layer. Hence, in the reflective display, generation of double images and blurred display caused by parallax can also be avoided.

In the second liquid crystal device, similar to that in the first liquid crystal device described above, a lighting unit may be provided at the second substrate at the side thereof opposite to the liquid crystal layer. When the lighting unit described above is provided, light from the lighting unit is transmitted through the transflective electrode, so that a bright display can be obtained in a dark environment by additionally functioning as a transmissive display.

In the embodiment of the second liquid crystal device, a protective film is formed between the colored layer and the transflective electrode. In this embodiment, since the colored layer and the transflective electrode are separated by the protective film, the second object of preventing damage and deterioration of aluminum used as the transflective electrode can be achieved by a simple process.

The protective film is preferably an anodized film of the metal constituting the transflective film. The reasons for that are that the thickness of the anodized film can be easily controlled, and the film can be formed as a dense film having fewer defects such as pinholes. In addition, the colored layer may be formed by a so-called "electrodeposition method" with proper thickness control. As other examples of the protective films, oxide films other than the metal constituting the transflective film, nitride films, and organic dielectric films may be used, and two or more films described above may be optionally combined.

In another embodiment of the second liquid crystal device, the transflective electrode is provided with an opening in the form of a slit, and the colored layer is formed in an area corresponding to that at which the slit is formed. According to this embodiment, in the transmissive display, light is transmitted through (passes through) a slit as well as passes through the colored layer, the second transparent electrode, and the liquid crystal layer sequentially, and is emitted at the first substrate side. Since the colored layer is formed in an area corresponding to that at which the slit is provided, light passing through the slit is colored by the colored layer, so that color reproducibility of the transmissive display can be improved.

Compared to the first liquid crystal device described above having a slit at the transflective electrode, the second transparent electrode is present in the opening of the slit, so that an electric field is applied to the opening of the slit. Hence, liquid crystal molecules positioned at the slit portion are oriented regardless of the electric field leakage from the edge of the slit; light having no rotary polarization is prevented from passing through the slit. As a result, display quality is improved. Moreover, the slit can be formed independently from a forming area for a pixel or a dot.

Similar to the first liquid crystal device, various driving methods for the second liquid crystal device may be employed, which include a passive matrix method and other methods such as an active matrix method. Among these, in an embodiment to which the active matrix method is applied, the second transparent electrode also serves as a pixel electrode, and a switching element is connected to each pixel electrode described above. In this embodiment, since the second transparent electrode also serves as a pixel electrode, and a switching element is connected to each pixel electrode, an ON pixel and an OFF pixel can be separated electrically by the switching element. Therefore, a liquid crystal device having superior contrast and response, and very fine display, can be easily achieved.

In another embodiment employing the active matrix method for the second liquid crystal device, the first transparent electrode also serves as a pixel electrode, and a switching element is connected to each pixel electrode described above. According to this embodiment, since the first transparent electrode also serves as a pixel electrode, and a switching element is connected to each pixel electrode, similar to the above, an ON pixel and an OFF pixel can be separated electrically by the switching element. Therefore, a liquid crystal device having superior contrast and response, and very fine display, can be easily achieved. In addition, the switching element is provided at the first substrate side in which the first transparent electrode is formed, instead of at the second substrate side in which the colored layer is formed on the lower layer of the second transparent electrode, so that no consideration of heat stability of the colored layer in the process for manufacturing the switching element is necessary. Therefore, flexibility in the manufacturing process can be enhanced. Similar to the first liquid crystal device, various elements such as a thin film diode (TFD) and a thin film transistor (TFT) can also be used as a switching element in these embodiments.

The first object described above can also be achieved by a second electronic apparatus provided with the second liquid crystal device described above. According to the second electronic apparatus, in both the transmissive display and the reflective display, various electronic apparatuses can be produced provided with the liquid crystal devices which have improved color reproducibility and no generation of double images and blurred display caused by parallax. Consequently, the electronic apparatus as described above can yield high quality display in a bright environment and a dark environment, regardless of the level of ambient light.

For simultaneously achieving the first and the second objects described above, the third liquid crystal device of the present invention comprises a first substrate and a second substrate, a liquid crystal layer disposed between the first substrate and the second substrate, a transparent electrode formed on the surface of the first substrate adjacent to the liquid crystal layer, a reflective electrode formed on the surface of the second substrate adjacent to the liquid crystal layer, a protective film for protecting the reflective electrode, and a colored layer formed on the upper surface of the protective film.

According to the third liquid crystal device, incident light from the first substrate side is reflected at the reflective electrode after passing through the liquid crystal layer, the colored layer, and the protective film sequentially, and is then emitted at the first substrate side after retracing its path through which the light passed. At this step, since the light is colored by the colored layer formed above the upper surface of the reflective electrode with the protective film therebetween, the first object described above of improving color reproducibility can be achieved. At the same time, since the colored layer and the reflective electrode are separated by the protective film formed therebetween, damage or deterioration of aluminum used as the reflective electrode during the process for forming the colored layer is prevented beforehand by a simple process, whereby the second object can be achieved. In addition, since the reflective electrode is formed on the liquid crystal layer side of the second substrate, the distance from the reflective electrode to the liquid crystal layer is short. Hence, generation of double images and blurred display caused by parallax can be avoided.

The protective film is preferably an anodized film of the metal constituting the reflective electrode. The reasons for this are that the thickness of the anodized film can be easily controlled, and the film can be formed as a dense film having fewer defects such as pinholes. In addition, the colored layer may be formed by a so-called "electrodeposition method" with proper thickness control. As other examples of the protective films, oxide films other than the metal constituting the transflective films, nitride films, and organic dielectric films may be used, and two or more films described above may be optionally combined.

As a driving method for the third liquid crystal device, similar to the first and the second liquid crystal devices, various driving methods may be employed, which include a passive matrix method and other methods such as an active matrix method. Among those, in an embodiment to which the active matrix method is applied, the reflective electrode also serves as a pixel electrode, and a switching element is connected to each pixel electrode described above. In this embodiment, since the reflective electrode also serves as a pixel electrode, and a switching element is connected to each pixel electrode, an ON pixel and an OFF pixel can be separated electrically by the switching element. Therefore, a liquid crystal device having superior contrast and response, and very fine display, can be easily achieved.

In another embodiment employing the active matrix method for the third liquid crystal device, the transparent electrode described above also serves as a pixel electrode, and a switching element is connected to each pixel electrode described above. According to this embodiment, since the transparent electrode also serves as a pixel electrode, and a switching element is connected to each pixel electrode, an ON pixel and an OFF pixel can be separated electrically by the switching element. Therefore, a liquid crystal device having superior contrast and response, and very fine display, can be easily achieved. Similar to the first and the second liquid crystal devices, various elements such as a TFT element and a TFD element can be used as a switching element in these embodiments.

The first and the second objects can also be achieved by a third electronic apparatus having the third liquid crystal device described above. According to the third electronic apparatus in the reflective display, various electronic apparatuses can be produced provided with the liquid crystal devices which have improved color reproducibility and no generation of double images and blurred display caused by parallax.

BEST MODE FOR CARRYING OUT THE INVENTION

Hereinafter, each embodiment of the best mode for carrying out the present invention will be described with reference to the corresponding drawings.

FIRST EMBODIMENT

Figure 1:
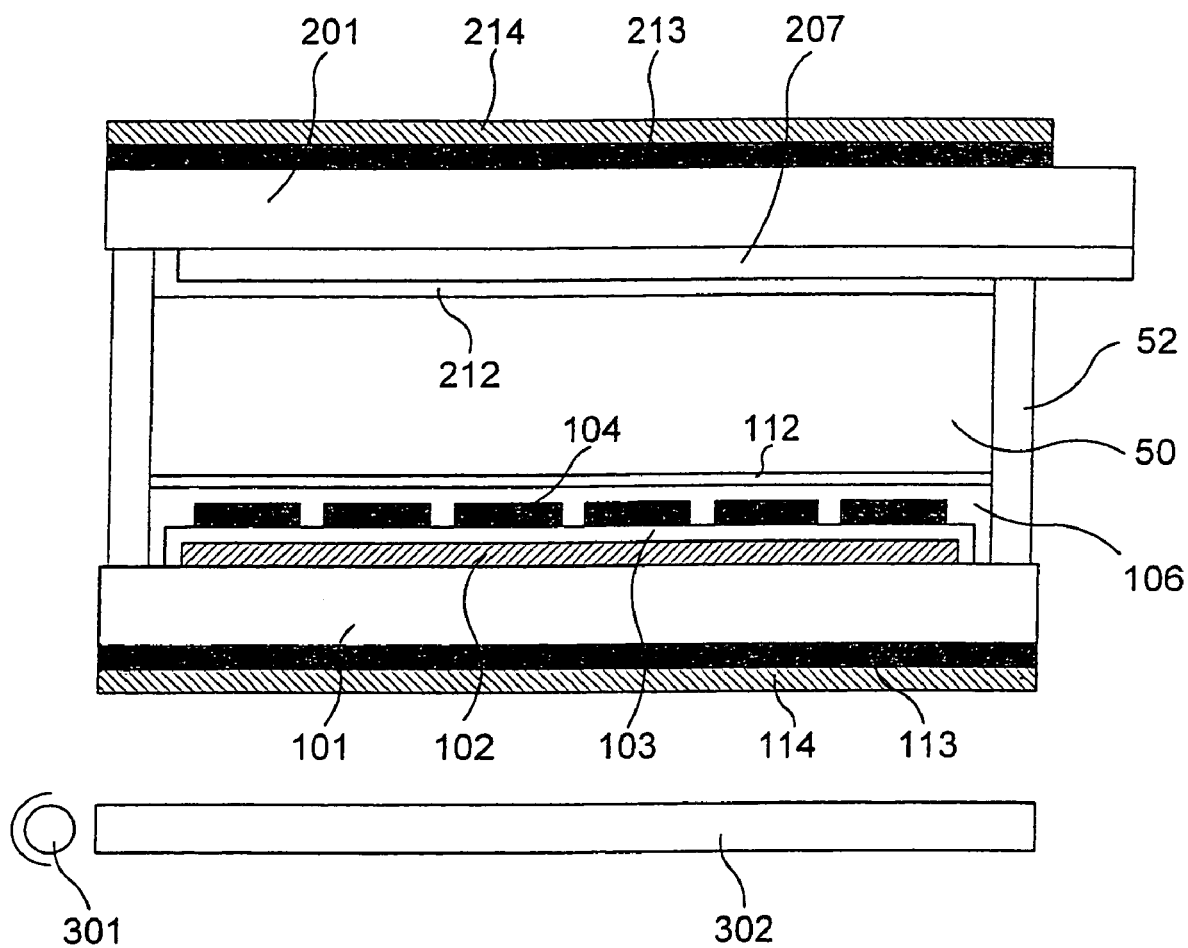
FIG. 1 is a schematic cross-sectional view showing an arrangement of a liquid crystal device according to a first embodiment.

First, a liquid crystal device according to the first embodiment will be explained. The liquid crystal device is a transflective liquid crystal device that produces a reflective display alone in a bright environment and additionally uses a transmissive display in a dark environment. FIG. 1 is a schematic cross-sectional view showing an arrangement of the liquid crystal device.

In this figure, the liquid crystal device has the arrangement in which a liquid crystal layer 50 is encapsulated between two transparent substrates 101 and 201 by sealing materials 52 having frame shapes. The liquid crystal layer 50 is a nematic liquid crystal having a predetermined twisted angle. On the inner surface of the substrate 201 which is at the upper part (observation side) of the figure, transparent electrode 207 composed of indium tin oxide (ITO) or the like is formed in a form described later. An alignment film 212 is disposed on the surface of the transparent electrode 207 and is processed by a rubbing treatment in a predetermined direction.

On the inner surface of the substrate 101 that is at the lower part of the figure, a transflective electrode 102 composed of aluminum or the like is formed in a shape described later. Since the transflective electrode 102 according to the embodiments is formed with a relatively reduced thickness of 15 to 20 nm, the transflective electrode functions as a transflective film provided with a reflectance of approximately 85% and a transmittance of approximately 10%. The transflective electrode 102 is arranged to reflect incident light from the liquid crystal layer 50 side (upper side) so as to introduce it again into the liquid crystal layer 50, and on the other hand, the transflective electrode 102 is arranged to transmit incident light from the substrate 101 side (lower part) so as to introduce it into the liquid crystal layer 50. The transflective film described above may be also realized by an arrangement of the transflective electrode 102 provided with openings in the form of slits, as will be described later.

Next, above the upper surface of the transflective electrode 102 described above, a protective film 103 and a color filter 104 are formed sequentially, as will be described later. In the color filter 104, three colors such as R (red), G (green), and B (blue) are arranged in a predetermined pattern. On the upper surface of the color filter 104, a planarization film 106 composed of an organic film or the like is formed to eliminate steps. Moreover, an alignment film 112 is formed on the upper surface of the planarization film 106 and is processed by a rubbing treatment in a predetermined direction.

On the outer surface of the upper substrate 201, a retardation plate 213 and a polarizer 214 are disposed sequentially viewed from the substrate 201 side. Whereas, under the lower side of the liquid crystal panel, that is, on the outer side of the lower substrate 101, a retardation plate 113 and a polarizer 114 are disposed sequentially viewed from the substrate 101. Moreover, a backlight having a fluorescent tube 301 emitting white light and a light guide plate 302 having an incident edge along the fluorescent tube 301, is disposed under the polarizer 114. Among those mentioned above, the light guide plate 302 has a transparent body, such as a plate acrylic resins, having a roughened surface formed for light scattering or a printed layer for scattering formed over an entire rear side of the light guide plate 302. The light guide plate 302 is arranged to receive at the incident edge thereof white light emitted from the fluorescent tube 301 as a light source and to emit substantially uniform light from the surface (upper part in the figure) of the light guide plate 302. As a backlight, a light-emitting diode (LED), electroluminescence (EL), or the like may be used.

Next, among displays of an arrangement of the liquid crystal device described above, a reflective display will be explained first. In the reflective display, ambient light passes through the liquid crystal layer 50 and the color filter 104 after being transmitted through the polarizer 214 and the retardation plate 213 sequentially, and is then reflected by the transflective electrode 102. The reflected light retraces its path through which the light passed, and is emitted at the polarizer 214 again. At this time, brightness when light passes through the polarizer 214 (bright state), brightness when light is absorbed (dark state), and intermediate brightness therebetween are controlled depending on an applied voltage on the liquid crystal layer 50.

Next, a transmissive display of the liquid crystal device will be explained. In the transmissive display, light from the backlight is polarized into a predetermined state by being transmitted through the polarizer 114 and the retardation film 113 sequentially. Then, the light is introduced to the color filter 104 and the liquid crystal layer 50 after being transmitted through the transflective electrode 102, and is emitted at the polarizer 214 through the retardation film 213. At this time, brightness when light passes through the polarizer 214 (bright state), brightness when light is absorbed (dark state), and intermediate brightness therebetween are controlled depending on an applied voltage on the liquid crystal layer 50.

In the reflective display and the transmissive display of the liquid crystal device described above, since light passes through the color filter 104, improvement of color reproducibility can be achieved. In addition, the distance from the transflective electrode 102 to the liquid crystal layer 50 is short since the transflective electrode 102 is formed at the inner surface of the lower substrate 101, that is, at the liquid crystal layer side. Hence, in the reflective display, generation of double images and blurred display caused by parallax can be avoided.

In the liquid crystal device, since light from the backlight is transmitted through the transflective electrode, bright display can be obtained in a dark environment by additionally functioning as a transmissive display. In addition, in a bright environment, a bright display can be achieved by the reflective display alone, and electrical power consumption can be reduced by switching off the backlight.

Instead of the backlight, an arrangement having a front light provided over the upper substrate 201 and a mechanism under the lower substrate 101 for introducing ambient light may work as well. In this arrangement, the transmissive display mainly works in a bright environment and the reflective display mainly work in a dark environment.

(Arrangement and Manufacturing Process for the Lower Substrate)

Figure 2:
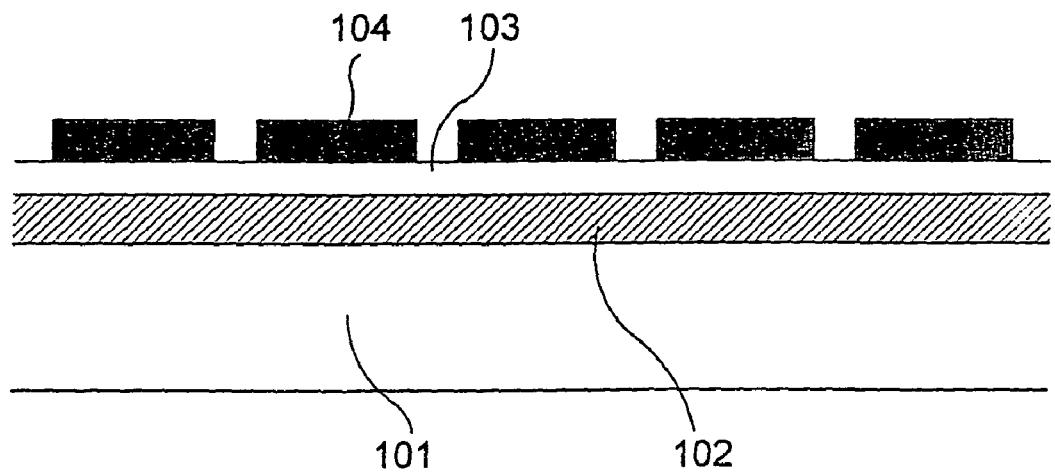
FIG. 2 is a cross-sectional view illustrating an example of a substrate structure of the first embodiment.

An arrangement and a manufacturing process of the lower substrate 101 will be explained, in which the transflective electrode 102, the protective film 103, and the color filter 104 are formed sequentially. FIG. 2 is a cross-sectional view showing an example of the arrangement of the substrate 101, in which the state of the arrangement being formed up to the color filter 104 is shown. Hereinafter, a manufacturing process up to this state will be briefly explained.

First, the transflective electrode 102 composed of aluminum is formed on the substrate 101 composed of a transparent glass or the like. Second, the transflective electrode 102 is anodized to form an oxide film thereon, and the oxide film is used as the protective film 103. An electrolyte used for anodization is, for example, a solution containing 1 to 10 weight percent salicylic ammonium and 20 to 80 weight percent ethylene glycol. An electrolytic potential between 5 and 250 V, and current density between 0.001 and 1 mA/cm$^2$ may be set according to desired thickness. Components other than the above for the electrolyte may be employed. Electrolytic potential and current density may be set optionally in accordance with an electrolyte. Third, the color filters 104 of R (red), G (green), B (blue) are formed by a color resist method. An arrangement of the color filters 104 is chosen from patterns, such as stripes, mosaics, and triangles, in accordance with the application.

The substrate 101 is not limited to a glass; a substrate having elasticity such as a plastic may be used. The protective film 103 is not limited to an anodized film: for example, $SiO_2$ or $Si_3N_4$ deposited by a chemical vapor deposition method, or an organic dielectric film formed by a spin coat method and a roll coat method may be used. In particular, since anodization may be difficult to apply when the transflective electrode 102 is used as a pixel electrode, it is effective to use $SiO_2$, $Si_3N_4$, or an organic dielectric film as a protective film 103.

A method for manufacturing the color filter 104 is not limited to a color resist method; a color filter 104 may be formed by a method such as dyeing, transfer, or printing. In addition, by reducing a thickness of the protective film 103 formed by anodization, so long as the transflective electrode 102 is protected, the color filter 104 may be formed by a method of electrodeposition.

Figure 3:
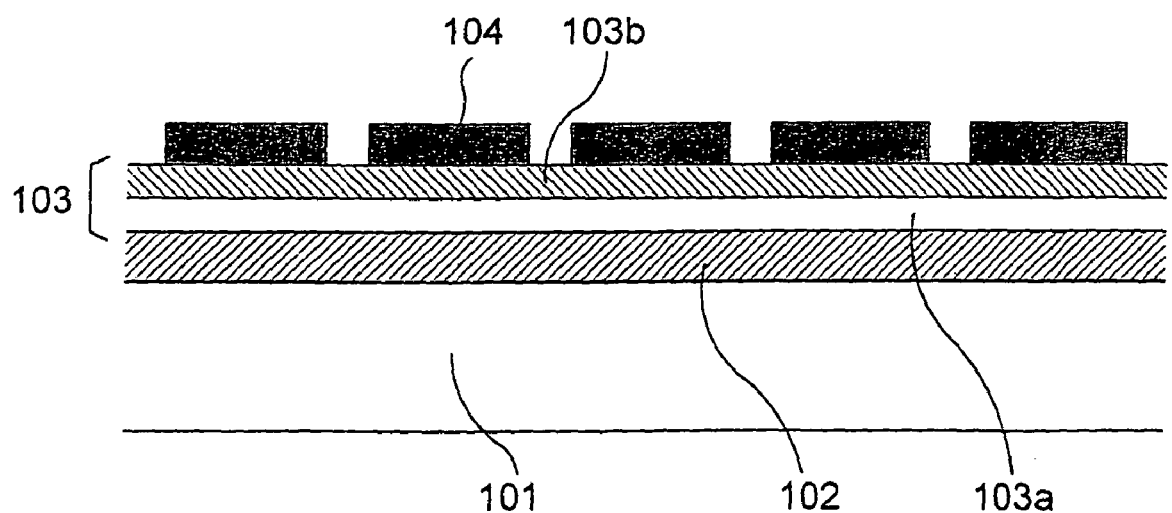
FIG. 3 is a cross-sectional view illustrating another example of a substrate structure of the first embodiment.

The transflective electrode 102 is not limited to aluminum; a metal primarily containing silver may be used. However, in this case, $SiO_2$ or $Si_3N_4$ deposited by chemical vapor deposition, or an organic dielectric film is to be used as a protective film 103. In addition, the protective film 103 above the substrate 101 is not limited to a mono-layer film; a multi-layer film arrangement may also be used, as described below. FIG. 3 is a cross-sectional view showing the arrangement of the substrate 101, in which the state of the arrangement being formed up to the color filter 104 is shown. Hereinafter, a manufacturing process up to this state will be briefly explained.

In this example of the arrangement, first, the transflective electrode 102 composed of aluminum is formed on the substrate 101 composed of a transparent glass or the like. Second, the transflective electrode 102 is anodized, in a manner similar to that described above, so as to form an anodized film 103a on the surface of the transflective electrode 102. The conditions for anodization is similar to that described above. Third, by using chemical vapor deposition, a $SiO_2$ film 103b is formed. Therefore, in this arrangement, a combined film of the anodized film 103a and the $SiO_2$ film 103b is used as the protective film 103. Fourth, the color filter 104 is formed by a color resist method.

In this example of the arrangement, the combined film of the anodized film 103a and the $SiO_2$ film 103b is used as the protective film 103; a combined film of a $SiO_2$ film in place of the anodized film 103a and a $Si_3N_4$ film in place of the $SiO_2$ film 103b may be used. An organic dielectric film may also be used. A combined film of three layers or more may also be used; however, taking the complication of manufacturing processes and reduction in reflectance into consideration, a combination of two up to three layers is believed to be preferable.

In addition, when the protective film 103 is composed of a multi-layer film, a metal primarily containing silver may be used. However, since anodization is difficult to perform in this case, a combined film between $SiO_2$, $Si_3N_4$, an organic dielectric film, and the like is to be used as a protective film 103.

Figure 4:
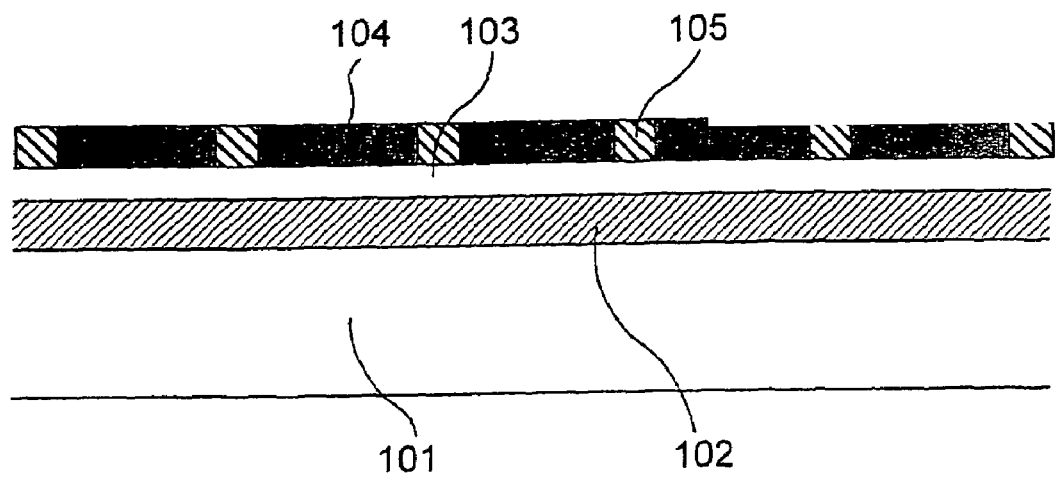
FIG. 4 is a cross-sectional view illustrating still another example of a substrate structure of the first embodiment.

Above the substrate 101 described above, a shading layer may be formed in the area at which the color filter 104 is not formed. FIG. 4 is a cross-sectional view showing this arrangement of the substrate 101, in which the state of the arrangement formed up to the color filter 104 and the shading layer 105 is shown. The shading layer 105 is provided to eliminate light leakage from a non-display portion of the liquid crystal device and to prevent reduction in contrast. Moreover, in an active matrix liquid crystal device which has pixel electrodes connected to switching elements, the shading layer 105 also has a role of preventing the switching elements from deterioration due to photoelectric current leakage. The shading film 105 may be formed separately from a formation of color filter 104 by using a color resist in which a metal such as chromium having high shading characteristic, or black pigment is dispersed. Whereas, by overlapping the color filters 104 of R (red), G (green), and B (blue), the shading film 105 may be formed by the color filters 104 themselves.

Figure 5:
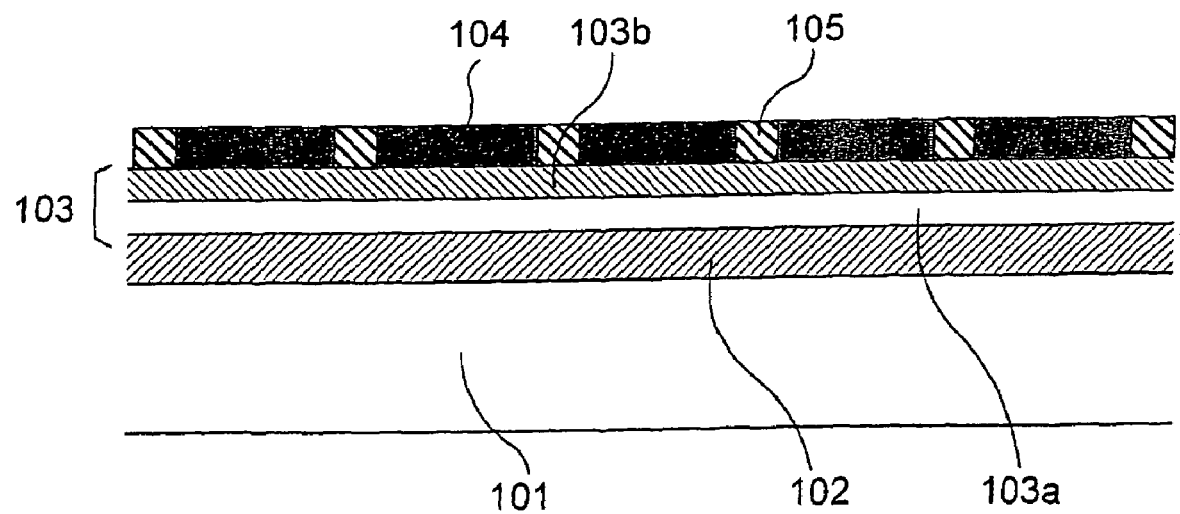
FIG. 5 is a cross-sectional view illustrating a further example of a substrate structure of the first embodiment.

Moreover, in the example of the arrangement having the shading film 105, as shown in FIG. 5, the protective film 103 may be composed of films 103a, 103b or the like by optionally laminating an anodized film, a $SiO_2$ film, a $Si_3N_4$ film, and an organic dielectric film. The arrangement mentioned above is as described before.

In FIG. 2 to FIG. 5, above the substrate 101 at which the color filter 104 and the shading layer 105 are provided, the planarization film 106 and the alignment film 112 are formed. The arrangement described above is to be applied to the liquid crystal device.

Even though the shading layer 105 is omitted from FIG. 1, the shading layer 105 is preferably provided because it is effective for obtaining high contrast and for preventing the switching element from deterioration. In FIG. 1, the protective film 103 is a mono-layer film; however, similar to that described above, the protective film 103 may be composed by optionally laminating an anodized film, a $SiO_2$ film, a $Si_3N_4$ film, and an organic dielectric film.

In the explanation described above, R (red), G (green), and B (blue) are used in the color filter 104; however, this is not so limited, three colors such as Y (yellow), M (magenta), and C (cyan) may also be used. The transflective electrode 102 is explained, in particular, as one having no patterning; however, as will be described later, it should be noted that, depending on the situation, the transflective electrode may be patterned in a predetermined form or may be not patterned.

In such a substrate 101, the color filter 104 and the shading layer 105 are separated from the transflective electrode 102 by the protective film 103. Hence, during the manufacturing process for the color filter 104 and the shading layer 105, damage or deterioration of aluminum used for the transflective electrode 102 may be prevented beforehand by a simple process.

(Slit Provided at Reflective Electrode)

Figure 6:
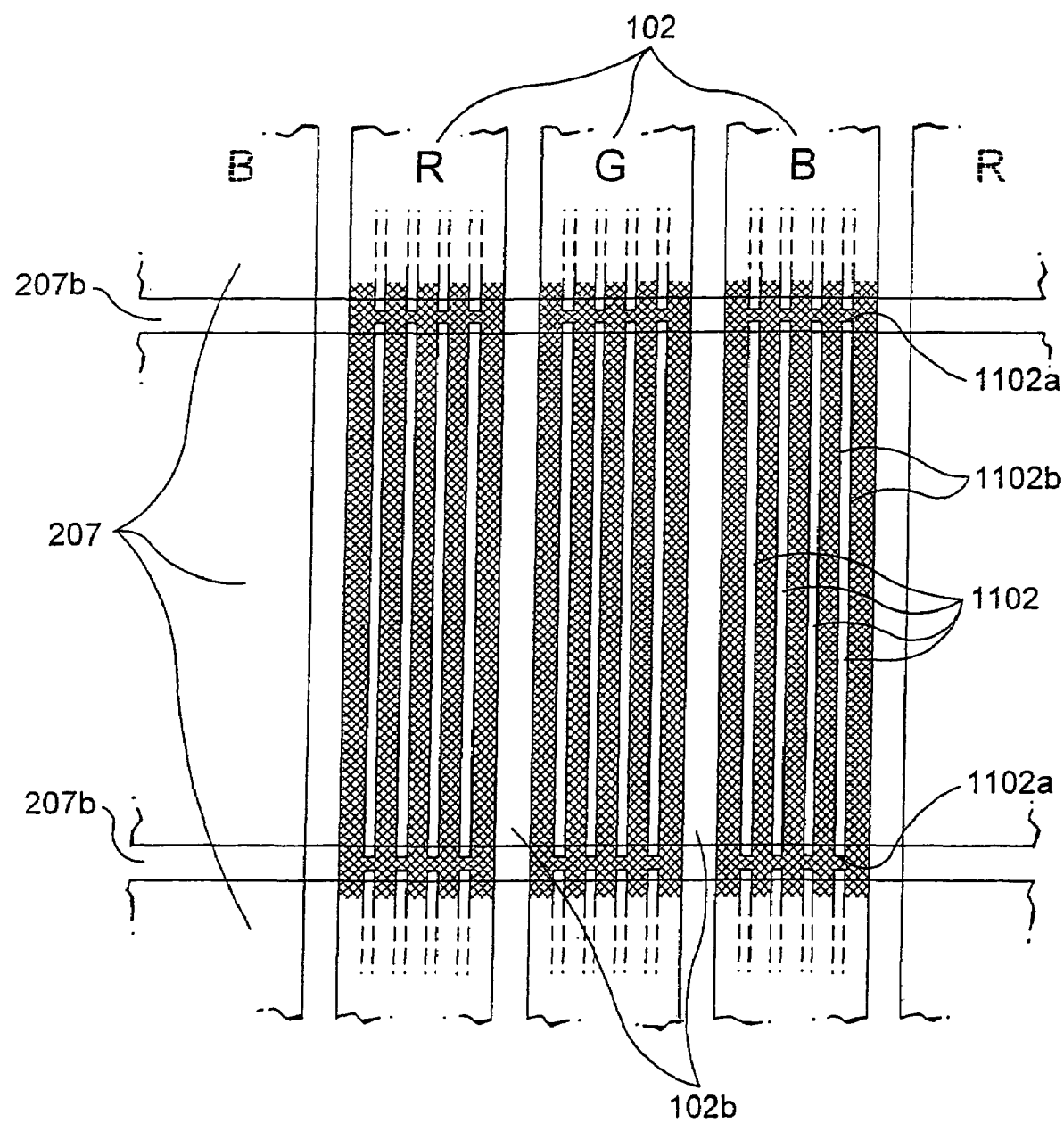
FIG. 6 is a plan view showing a reflective electrode provided with a slit of the first embodiment.

Next, the case of providing slits in the transflective electrode 102 so as to serve as a transflective film, instead of forming thin aluminum, will be explained. FIG. 6 is a plan view showing a part of an arrangement of a liquid crystal device. The example of the arrangement shown in the Figure is a case of a passive matrix liquid crystal device. On the inner surface of the upper substrate, plural transparent electrodes 207 in the form of stripes are formed extending in lateral directions shown in the Figure. Whereas, on the inner surface of the lower substrate, plural transflective electrodes 102 in the form of stripes are formed extending in longitudinal directions shown in the Figure. One dot is formed in an area at which one of the transflective electrodes 102 assigned to R (red), G (green), and B (blue), and one of the transparent electrodes 207 overlap each other, and one pixel in the form of an approximate regular tetragon is formed by the adjoining three dots of RGB. In each transflective electrode 102, four slits 1102 in the form of rectangles are provided in each dot, and the transmissive display is arranged so that light passes through these slits.

Since each rectangular slit 1102 in the transflective electrode is open, an oblique electric field by the shorter side 1102a (the component in the substrate is parallel to the longitudinal side of the slit 1102) of the slit 1102 is weakened in accordance with the length of the longer side of the slit 1102. That is, by an oblique electric field by the longer side 1102b (the component in the substrate is orthogonal to the longitudinal side of the slit 1102), movement of liquid crystal molecules adjacent to the slit is controlled. Therefore, orientation defects in the liquid crystal can be suppressed, which are caused by inconsistencies between the oblique electric field of the shorter side 1102a and that of the longer side 1102b of each slit 1102. On the whole, the orientation defects in the liquid crystal caused by the slit 1102 can be suppressed, and furthermore, it becomes possible to positively utilize the oblique electric field by the longer side 1102b. Consequently, display defects can be reduced and a threshold voltage for driving the liquid crystal device can be lowered, and lower electrical power consumption becomes possible.

The rectangular slits 1102 described above can be easily formed by a photo process, an etching process, and a stripping process by the use of a resist. That is, when the transflective electrodes 102 are patterned into predetermined shapes after the formation thereof, the slits 1102 are formed simultaneously. The widths of the slits 1102 are preferably not less than 0.01 µm and not more than 20 µm, and more preferably not more than 4 µm. When the widths are set as described above, the slits 1102 are difficult to see with an naked eye, and the transflective films, which simultaneously realize the reflective display and the transmissive display, can be formed while suppressing deterioration of display quality caused by forming the slits 1102. The slits 1102 are preferably formed so as to be not less than 5% and not more than 30% of the transflective electrodes 102 in terms of area ratio. When the ratio is set as described above, the transmissive display is realized by light incident on the liquid crystal layer 50 (see FIG. 1) through the slits 1102 and suppresses reduction of brightness in the reflective display.

The slits 1102 are formed along the longitudinal directions of the transflective electrodes 102 (accordingly, vertical directions in the Figure) as well as a plurality of the transflective electrodes 102 are formed at predetermined intervals in the form of stripes. Therefore, when the oblique electric field caused by the slits 1102 is controlled, oblique electric field caused by gaps 102b between the transflective electrodes 102 can be simultaneously controlled. Furthermore, the slits 1102 extend to positions at which the slits 1102 oppose gaps 207b between the transparent electrodes 207. Hence, since the shorter sides 1102a of the slits 1102 are located out of areas at which voltage are applied between the transflective electrodes 102 and the transparent electrodes 207, orientation defects caused by the shorter sides 1102a of the slits 1102 are considerably reduced. In view of this point, the slits 1102 may extend across a plurality of dots, and may further extend out of the display area.

In FIG. 6, however, the color filter 104 and the shading layer 105 are omitted from the figure, the color filter 104 is actually formed above the transflective electrode 102 separated by the protective film 103 and is formed at least in an area at which the transflective electrode 102 and the transparent electrode 207 overlap each other. Therefore, light being transmitted through the slit 1102 is arranged to be colored by the color filter 104. The shading layer 105 is formed in areas at which the color filters 104 are not formed above the substrate 101, such as areas opposing the gaps 102b between the transflective electrodes 102 and the gaps 207b between the transparent electrodes 207

Thus, the transflective electrodes 102 are used as the transflective film by providing the slits 1102, so that metallic films of aluminum or the like can be formed without decreasing the thickness, which is composed of aluminum or the like. Since light is colored by the color filter after being transmitted through (passing through) the slit, color reproducibility of the transmissive display can also be improved.

(Relationship between Shapes of Electrode and Positions of Color Filter to be Formed)

A shape of the transflective electrode 102 formed on the substrate 101 and a shape of the transparent electrode 207 formed on the substrate 201 will be explained in conjunction with a position of the color filter 104 to be formed.

Figure 7:
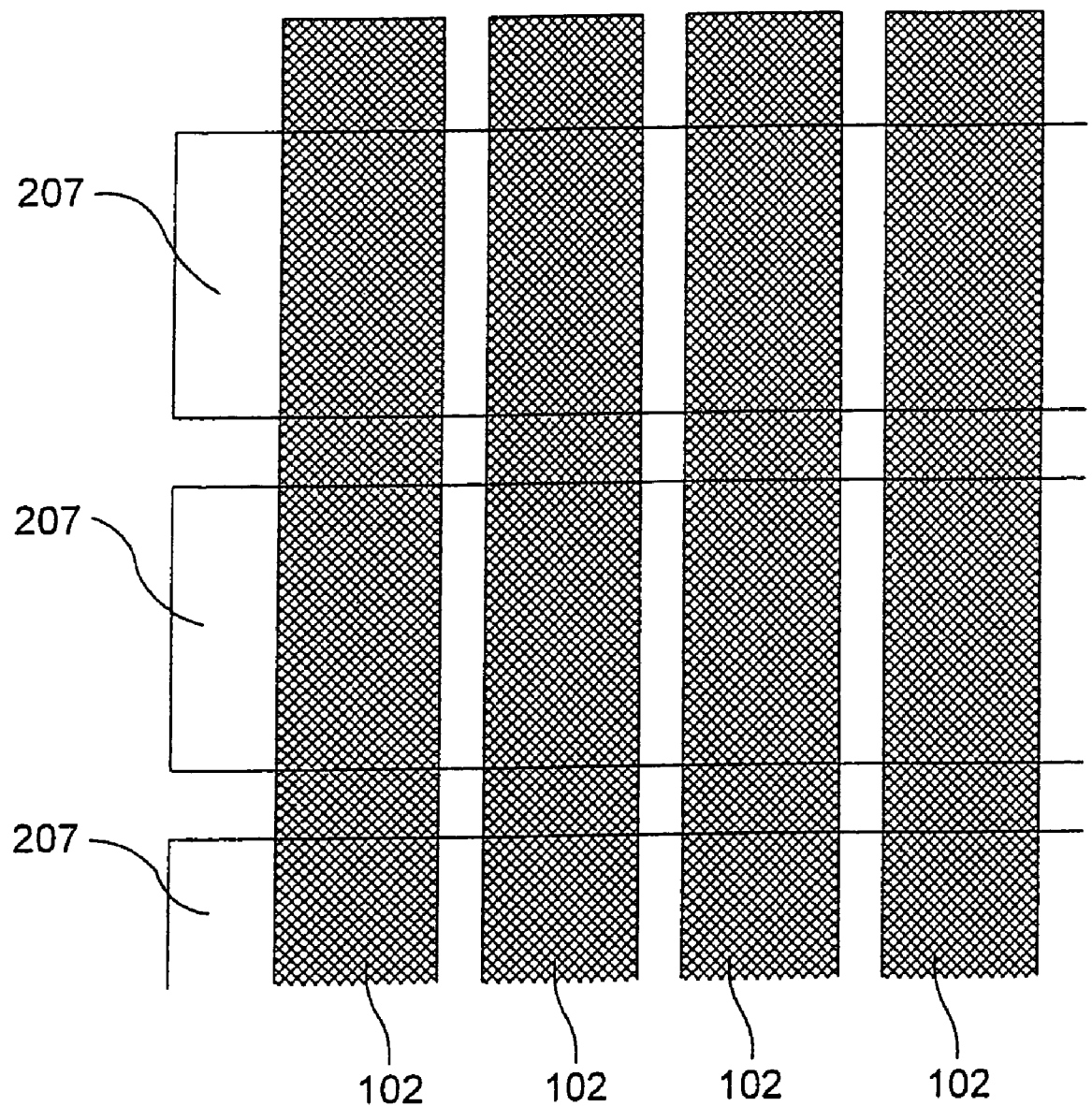
FIG. 7 is a plan view showing an example of a concrete arrangement of the reflective electrode of the first embodiment.

First, a case in which the liquid crystal device is of a passive matrix type will be explained. In this arrangement as shown in FIG. 7, plural transflective electrodes 102 in the form of stripes are formed on the inner surface of the lower substrate and plural transparent electrodes 207 in the form of stripes are formed on the inner surface of the upper substrate, and both electrodes are disposed diagonally to each other. The color filter 104 is arranged to be formed at a position corresponding to the position at which the transflective electrode 102 and transparent electrode 207 cross each other. In this arrangement, when a potential difference is generated between the both electrodes, the liquid crystal layer 50 (See FIG. 1) is to be driven in accordance with electric field strength.

Next, when this liquid crystal device uses an active matrix method, a two-terminal switching element represented by a TFD element and a three-terminal switching element represented by a TFT element can be used as a switching element. The switching elements may be provided at the upper substrate 101 (See FIG. 1) side, and may be provided at the lower substrate 201 (see FIG. 1) side. Consequently, since there are four combinations between the switching elements and the substrates at which the switching elements are to be formed, hereinafter, each combination will be explained respectively.

Figure 8:
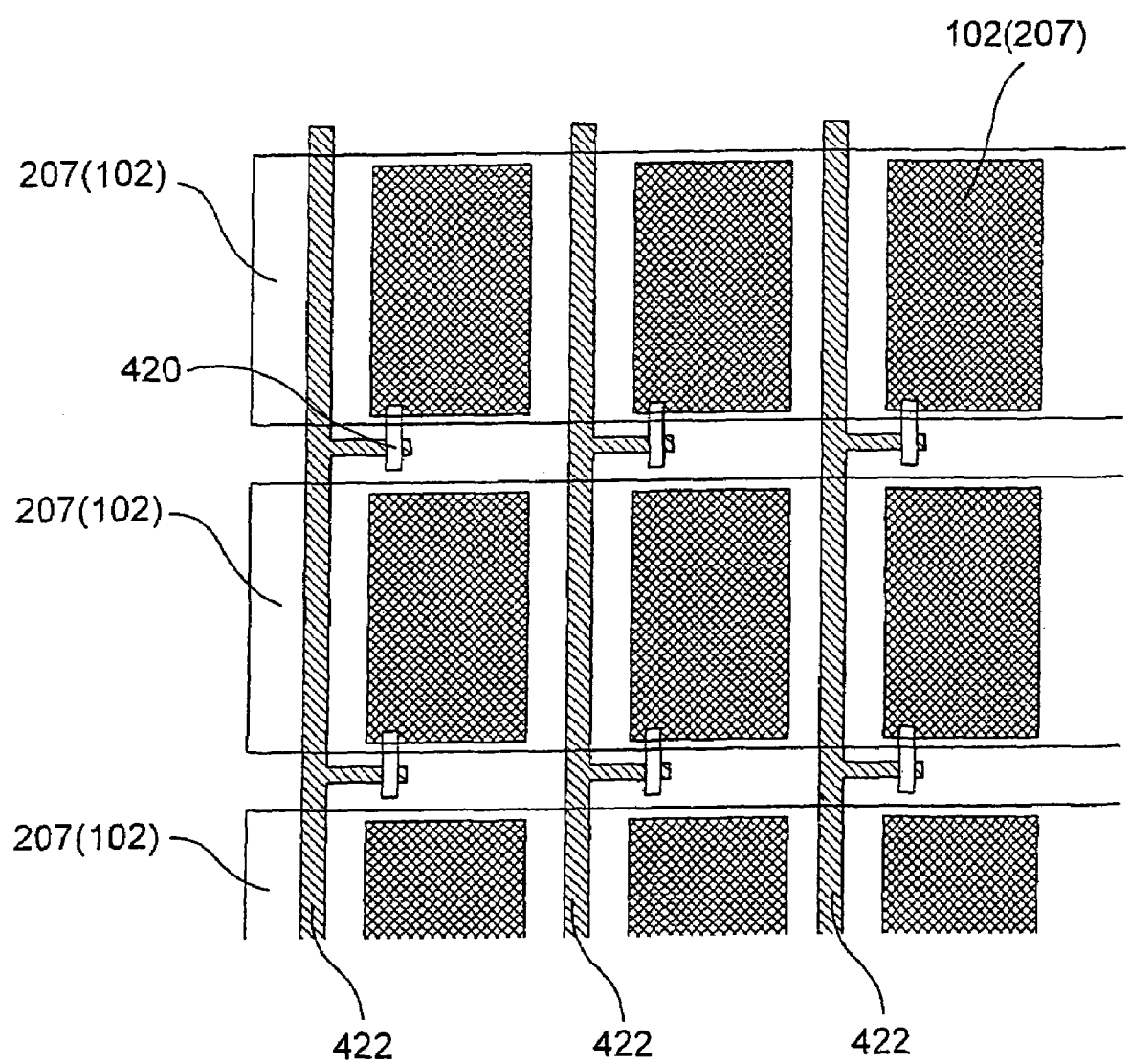
FIG. 8 is a plan view showing another example of a concrete arrangement of the reflective electrode of the first embodiment.

A first combination, in which the TFD elements are used as switching elements and the TFD elements are formed on the lower substrate 101, will be explained. An example of the arrangement in this case is shown in FIG. 8. In this example of the arrangement, the transflective electrodes 102 are formed as rectangular pixel electrodes at the inner surface of the lower substrate 101 and are disposed in the form of matrix arrays. Each transflective electrode 102 belonging to the same column is connected, respectively through TFD element 420 formed at the substrate 101, to one common data line 422 also formed at the substrate 101. Accordingly, the number of the data lines 422 formed is equivalent to that of the columns in the array arrangement of the transflective electrodes 102. Whereas, plural transparent electrodes 207 in the form of stripes are formed on the inner surface of the upper substrate 201 as scanning lines extending in the row directions and one transparent electrode 207 is disposed so as to cross one column of the transflective electrodes 102 as pixel electrodes. The color filter 104 is arranged to be formed above the transflective electrode 102 with the protective film 103 therebetween at the position corresponding to each intersection between the transflective electrodes 102 as pixel electrodes and the transparent electrodes 207.

Next, a second combination, in which the TFD elements are used as switching elements and the TFD elements are formed on the upper substrate 201, will be explained. In this example of the arrangement, the relationship between the transflective electrodes 102 and the transparent electrodes 207 is the reverse of that shown in FIG. 8. That is, as described in the parentheses in FIG. 8, the transparent electrodes 207 on the inner surface of the upper substrate 201 are formed as rectangular pixel electrodes and are disposed in the form of matrix arrays. Each transparent electrodes 207 belonging to the same column is, respectively through the TFD element 420 formed at the substrate 201, connected to one common data line 422 also formed at the substrate 201. Whereas, plural transflective electrodes 102 in the form of stripes are formed at the inner surface of the lower substrate 201 as scanning lines extending in the row directions, and one transflective electrode 102 is disposed so as to cross one column of the transparent electrodes 207 as pixel electrodes. The color filter 104 is arranged to be formed above the transflective electrode 102 with the protective film 103 therebetween at the position corresponding to each intersection between the transparent electrodes 207 as pixel electrodes and the transflective electrodes 102.

Figure 9:
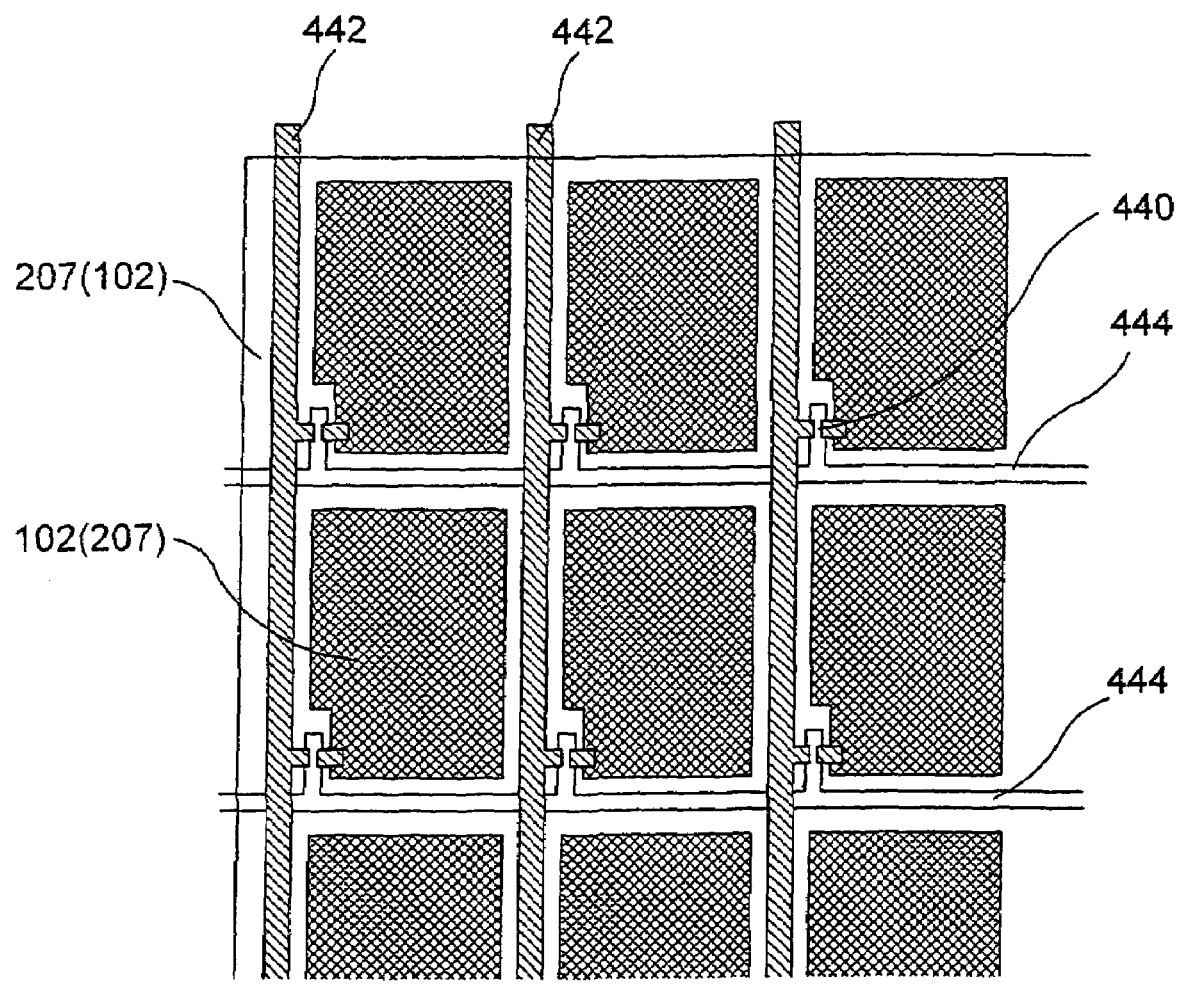
FIG. 9 is a plan view showing still another example of a concrete arrangement of the reflective electrode of the first embodiment.

Next, a third combination, in which the TFT elements are used as switching elements and the TFT elements are formed on the lower substrate 101, will be explained. An example of the arrangement in this case is shown in FIG. 9. In this example of the arrangement, the transflective electrodes 102 are formed as rectangular pixel electrodes at the inner surface of the lower substrate 101 and are disposed in the form of matrix arrays. Data lines 442 in column directions and scanning lines 444 in row directions at the substrate 101 are formed, respectively. The TFT elements 440 are disposed at intersections of the data lines 442 and the scanning lines 444. More specifically, the sources of the TFT elements 440 are connected to the data lines 442, the drains are connected to the transflective electrodes 102 as pixel electrodes, and the gates are connected to the scanning lines 444, respectively. The transparent electrodes 207 are formed over the entire upper substrate 201 so as to oppose every transflective electrode 102 as a pixel electrode. The color filter 104 is arranged to be formed above the upper surface of the transflective electrode 102 with the protective film 103 therebetween at the position corresponding to the position at which the transflective electrode 102 is formed.

Finally, a fourth combination, in which the TFT elements are used as switching elements and the TFT elements are formed on the upper substrate 201, will be explained. In this example of the arrangement, the relationship between the transflective electrodes 102 and the transparent electrodes 207 is the reverse of that shown in FIG. 9. That is, as described in the parentheses in FIG. 9, the transparent electrodes 207 on the inner surface of the upper substrate 201 are formed as rectangular pixel electrodes and are disposed in the form of matrix arrays, and data lines 442 in column directions and scanning lines 444 in row directions are formed at the substrate 201, respectively. The TFT elements 440 are disposed at intersections of the data lines 442 and the scanning lines 444. The transflective electrodes 102 are formed over the entire inner surface of the lower substrate 101 so as to oppose every transparent electrode 207 as a pixel electrode. The color filter 104 is arranged to be formed above the upper surface of the transflective electrode 102 with the protective film 103 therebetween at the position corresponding to the position at which the transparent electrode 207 is formed.

FIGS. 8 and 9 are simplified for convenience for explanation; the description of actual arrangements are as follows.

(TFD Element)

Figure 10:
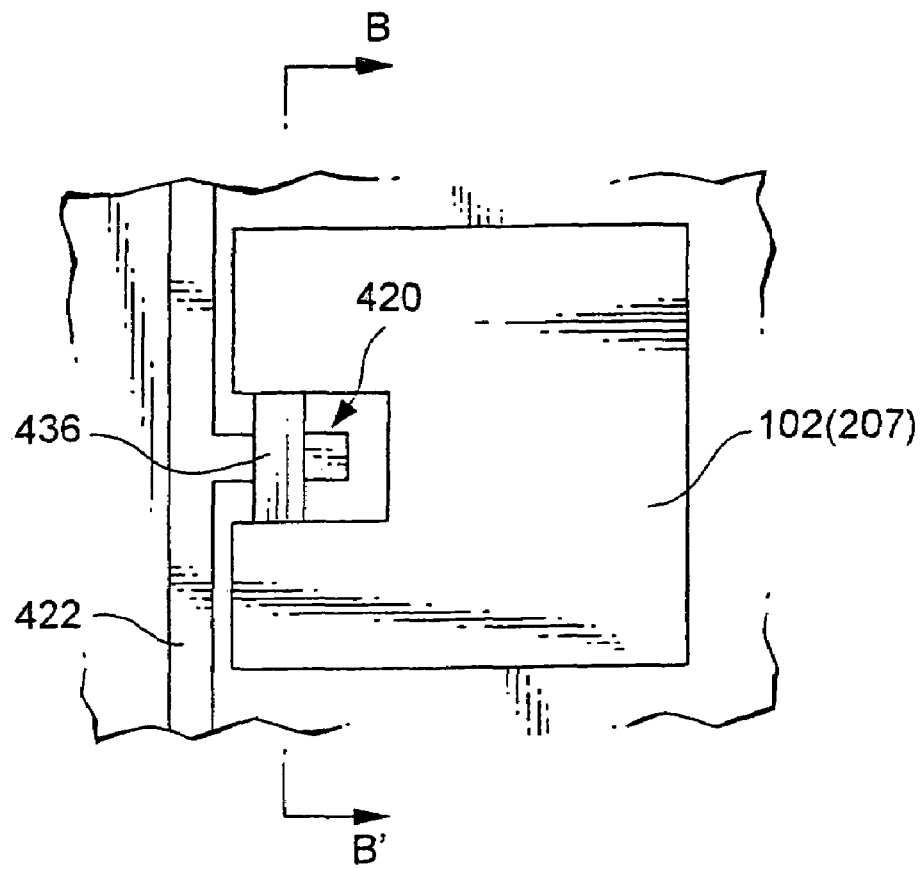
FIG. 10 is a plan view showing a layout of a periphery of a pixel electrode when a TFD element is used in the first embodiment.
Figure 11:
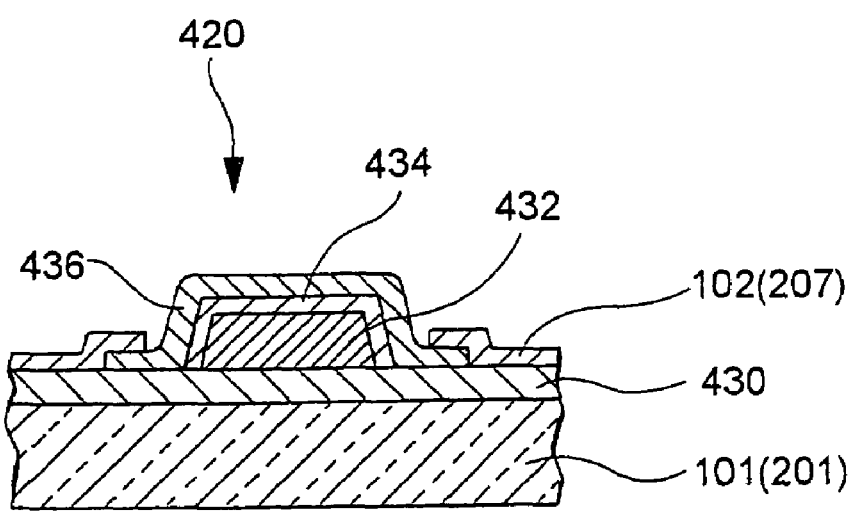
FIG. 11 is a cross-sectional view taken along the line B-B' in FIG. 10.

First, more specifically regarding the TFD element 420, an example of forming the TFD element 420 on the lower substrate will be explained. FIG. 10 is a plan view showing a layout adjacent to the TFD element 420. FIG. 11 is a cross-sectional view along the line B-B' in FIG. 10. As shown in these Figures, the TFD element 420 is formed on the upper surface of a dielectric film 430 as a ground layer which is formed on the substrate 101, and has a sandwich structure composed of, sequentially from the dielectric film 430, a first metallic film 432, a dielectric film 434, and a second metallic film 436. By the structure described above, the TFD element 420 has a positive and negative bidirectional diode switching characteristic. The first metallic film 432 constituting the TFD element 420 is formed as a scanning line 422, and the second metallic film 436 is connected to the transflective electrode 102. In FIGS. 8 and 10, the TFD element 420 is arranged to be connected to the data line 422; the TFD element 420 may be arranged to be connected to the scanning line.

In contrast, the substrate 101 having dielectric and transparent characteristic, as described above, is composed of glass, plastic, or the like. The reasons for providing the dielectric film 430 are to prevent the first metallic film 432 from being stripped from the ground layer during a heat treatment after the deposition of the second metallic film 436, and to prevent impurities from diffusing into the first metallic film 432. Accordingly, in a case when the above phenomena are not problems, the dielectric film 430 can be omitted.

The first metallic film 432 is a thin metallic film having electrical conductivity, and is composed of pure tantalum, tantalum alloy, or the like. The dielectric film 434 is formed, for example, by anodizing the surface of the first metallic film 432 in an electrolyte. The second metallic film 434 is a thin metallic film having electrical conductivity, and, for example, is composed of pure chromium, chromium alloy, or the like.

When the liquid crystal device is actually configured, the protective film 103 composed of $SiO_2$, $Si_3N_4$, an organic dielectric film, or the like is formed on the surface of the transflective electrode 102, and the color filter 104 and the like are formed so as to cover the region of the transflective electrode 102.

In the arrangement that the TFD element 420 is connected to the transflective electrode 102, when a scanning signal is fed to the transparent electrode 207 (See FIG. 8) as a scanning line and a data signal is fed to the data line 422, a predetermined electrical charge is accumulated in the liquid crystal layer 50 which is disposed between the transflective electrode 102 connected to the TFD element 420 and the data line opposing the transflective electrode 102. After accumulation of the electrical charge, when the TFD element 420 is in conduction by applying a nonselective voltage, the electrical charge accumulated is maintained while leakage in the OFF state of the TFD element is small and resistance of the liquid crystal layer 50 is sufficiently high. Thus, when the TFD element 420 is driven and the electrical charge to be accumulated in the liquid crystal layer 50 is controlled, an oriented state of the liquid crystal changes in each pixel, respectively, whereby a display of predetermined information can be produced.

The TFD element 420 is an example of a two-terminal non-linear element. In addition, an element, such as a metal semi-insulator (MSI) having diode element structure, or elements connected in reverse in series or in parallel, may be used.

Heretofore, a case for forming the TFD element 420 on the lower substrate was explained. When the TFD element 420 is formed on the upper substrate, the transparent electrode 207 is formed as a pixel electrode in place of the transflective electrode 102, as described above. (See the parentheses in FIGS. 10 and 11)

(TFT Element)

Figure 12:
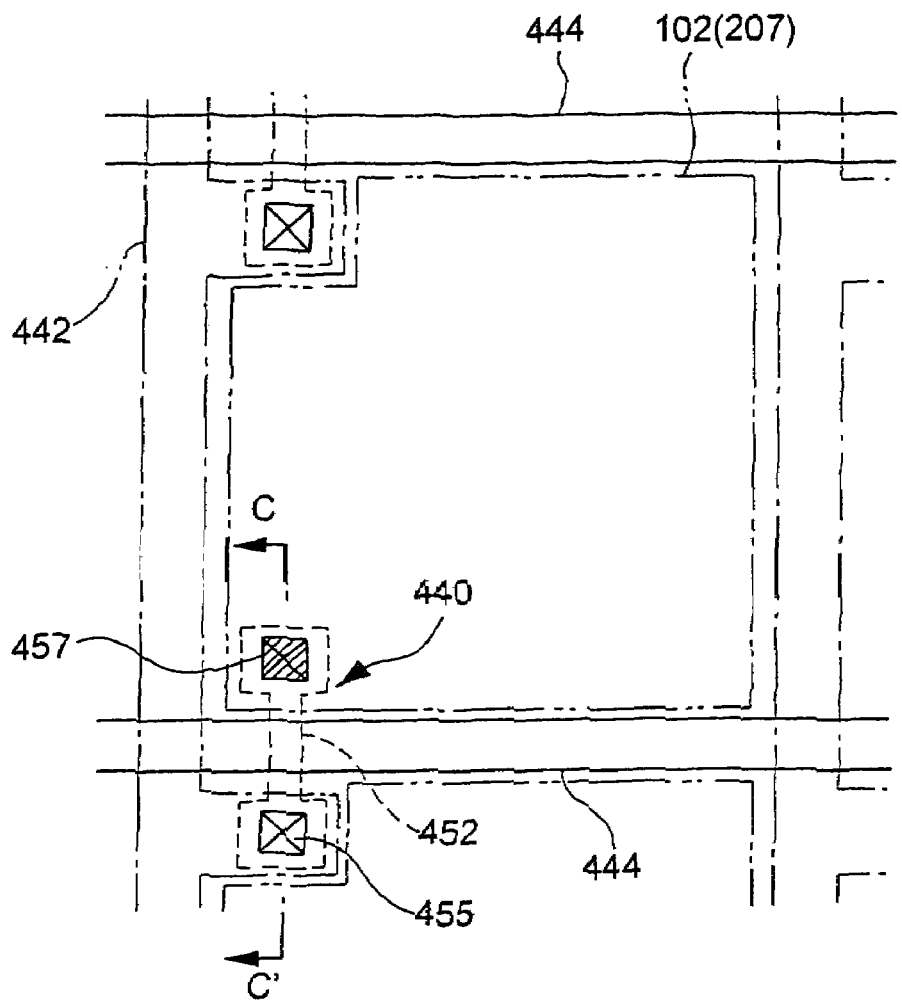
FIG. 12 is a plan view showing a layout of a periphery of a pixel electrode when a TFT element is used in the first embodiment.
Figure 13:
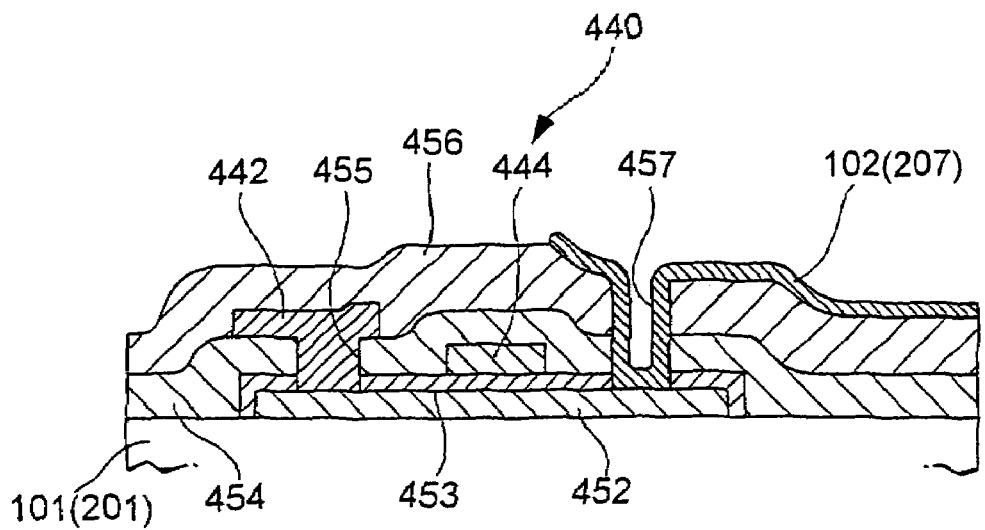
FIG. 13 is a cross-sectional view taken along the line C-C' in FIG. 12.

Next, specifically regarding the TFT element 440, an example of forming the TFT element 440 at the lower substrate will be explained. FIG. 12 is a plan view showing a layout adjacent to the TFT element 440. FIG. 13 is a cross-sectional view along the line C-C' of FIG. 12.

In these figures, a polysilicon layer 452 positioned right above the substrate 101 constitutes active layers (a source region, a drain region, and a channel region) of the TFT element 440, and a gate dielectric film 453 is formed by a thermal oxidation treatment on the surface of the polysilicon layer 452. Furthermore, a scanning line 444 composed of polysilicon or the like is formed on the surface of a gate dielectric film 453, after which a first interlayer dielectric film 454 is formed. A contact hole 455 is formed in the source region of the TFT element 440, and by the hole, the first interlayer dielectric film 454 and the gate dielectric film 453 are open. In these openings, the data line 442 composed of aluminum or the like is formed so as to connect with the source region. After forming the data line 442, a second interlayer dielectric film 456 is formed, whereas a contact hole 457 is formed in the drain region of the TFT element 440, and by the hole, the first interlayer dielectric film 454, the second interlayer dielectric film 456, and the gate dielectric film 453 are open. In these openings described above, the transflective electrode 102 as a pixel electrode composed of aluminum or the like is formed so as to connect with the drain region.

When the liquid crystal device is actually configured, the protective film 103 composed of $SiO_2$, $Si_3N_4$, an organic dielectric film or the like is formed on the surface of the transflective electrode 102, and the color filter 104 and the like are formed so as to cover the region of the transflective electrode 102. For preventing leakage of the electrical charge accumulated in the liquid crystal layer, a storage capacitance is provided in parallel to the liquid crystal layer at each transflective electrode 102 as a pixel electrode; however, these are omitted from the drawings.

In the arrangement in which the TFT element 440 is connected to the transflective electrode 102, when a scanning voltage is applied to the scanning line 444, the TFT element 440 becomes in conduction. Hence, an image signal applied to the data line 442 is fed to the transflective electrode 102 as a pixel electrode through the TFT element 440, and the image signal is written in the liquid crystal layer 50 disposed between the transflective electrode 102 and the transparent electrode 207 opposing thereto. Even when the TFT element 440 becomes in non-conduction by termination of application of the scanning voltage, the writing is maintained. Accordingly, since an oriented state of the liquid crystal in each pixel changes respectively in the arrangement described above, a display of predetermined information can be produced. The TFT elements 440 shown in the figures are just examples; various other types of elements may be used.

The case of forming the TFT element 440 at the lower substrate has been described above; however, in the case of forming the TFT element 440 at the upper substrate, as explained above, the transparent electrode 207 is formed as a pixel electrode in place of the transflective electrode 102. (See parentheses in FIGS. 12 and 13)

Thus, when the transflective electrode 102 is formed as a pixel electrode and is driven through the TFD element 420 or the TFT element 440, an ON pixel and an OFF pixel are separated electrically, whereby superior contrast and response, and very fine display, can be obtained.

SECOND EMBODIMENT

Figure 14:
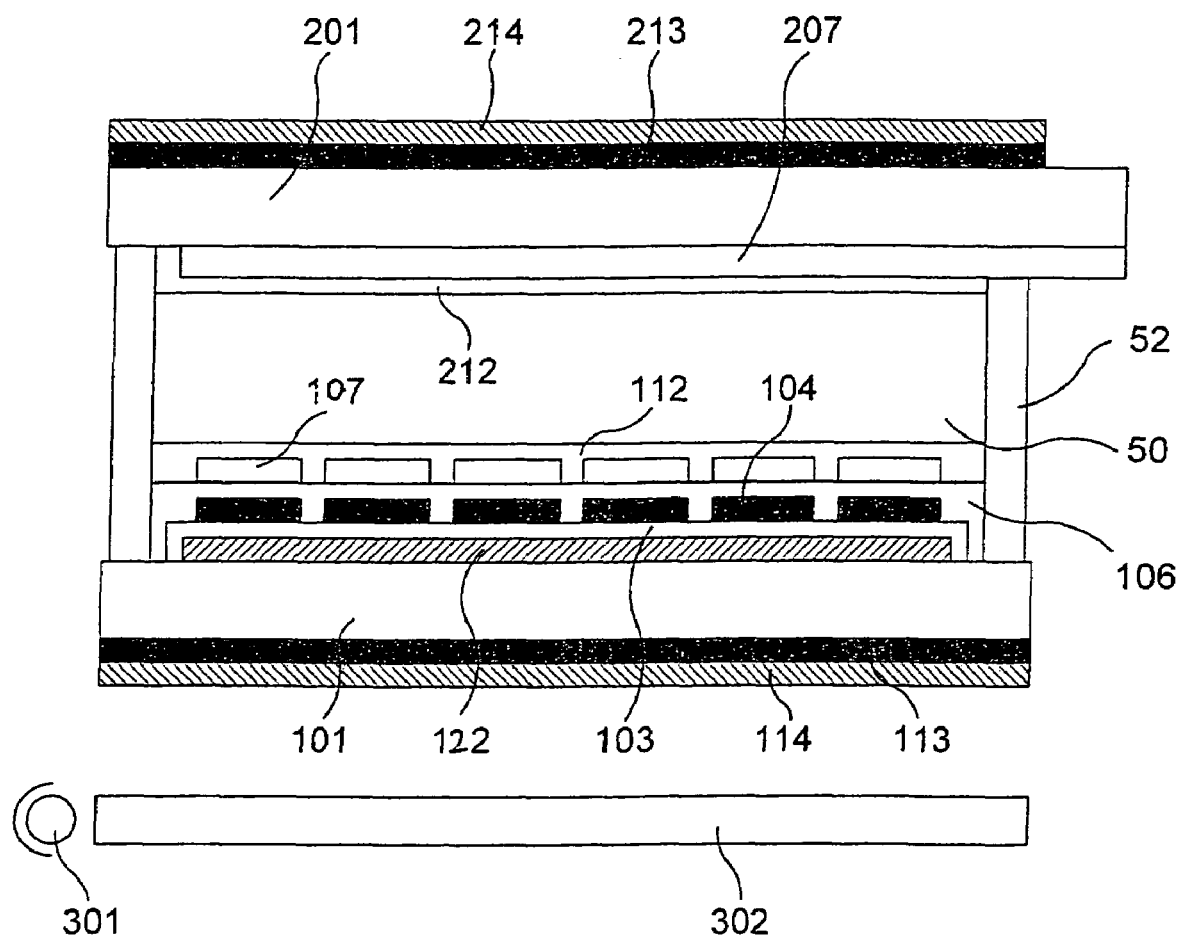
FIG. 14 is a schematic cross-sectional view showing an arrangement of a liquid crystal device according to a second embodiment.

First, a liquid crystal device according to the second embodiment will be explained. The liquid crystal device is a transflective liquid crystal device that uses only a reflective display in a bright environment and additionally uses a transmissive display in a dark environment. FIG. 14 is a schematic cross-sectional view showing an arrangement of the liquid crystal device.

The point of difference between the liquid crystal device shown in this figure and that in the first embodiment shown in FIG. 1 is as described below. That is, the difference is that the transflective electrode 102 in the first embodiment serves as an electrode for the liquid crystal device and the transflective film; however, in the second embodiment, these functions are separated. Hence, the transflective film 122 is formed on an inner surface of a lower substrate 101 in FIG. 14. This transflective film 122 does not function as an electrode for the liquid crystal device, so that patterning is not specifically required. The transflective film 122 is realized, similar to the transflective electrode 102 in the first embodiment, by forming a relatively thin film approximately 15 to 20 nm thick composed of aluminum or the like, or by forming slits as described above.

Next, a protective film 103 and a color filter 104 are formed (as shown in FIGS. 2 to 5) on the transflective film 122, and furthermore, a planarization film 106 is formed on the color filter 104. On the surface of the planarization film 106, a transparent electrode 107 such as ITO is formed in a predetermined form. Moreover, an orientation film 112 is formed on the surface of the transparent electrode 107 and is processed by a rubbing treatment in a predetermined direction. Explanations on other matters are omitted since those are similar to that in the first embodiment.

Next, in displays of the liquid crystal devices of this arrangement, a reflective display will be explained first. In the reflective display, ambient light passes through the liquid crystal layer 50 and the color filter 104 after being transmitted through a polarizer 214 and a retardation film 213 sequentially, and is then reflected by the transflective film 122. The light retraces its path through which light passed, whereby the light is emitted again at the polarizer 214. At this time, brightness when light passes through the polarizer 214 (bright state), brightness when light is absorbed (dark state), and intermediate brightness therebetween are controlled depending on the voltage applied to the liquid crystal layer 50.

Next, a transmissive display in the liquid crystal device will be explained. In the transmissive display, light from the backlight is polarized into a predetermined state by being transmitted through the polarizer 114 and the retardation film 113 sequentially. Then, the light is introduced to the color filter 104 and the liquid crystal layer 50 after being transmitted through the transflective film 122, and is emitted at the polarizer 214 through the retardation film 213. At this time, brightness when light passes through the polarizer 214 (bright state), brightness when light is absorbed (dark state), and intermediate brightness therebetween are controlled depending on the voltage applied to the liquid crystal layer 50.

In the reflective display and the transmissive display of the liquid crystal device described above, since light passes through the colored layer, similar to the first embodiment, improvement of color reproducibility can be achieved. In addition, the distance from the transflective film 122 to the liquid crystal layer 50 is short since the transflective film 122 is formed at the inner side of the lower substrate 101, that is, on the side of the liquid crystal layer. Hence, in a manner similar to that in the first embodiment, generation of double images and blurred display can be avoided in the reflective display. In the liquid crystal device described above, in a manner similar to that in the first embodiment, since light from the backlight is transmitted through the transflective electrode, bright display can be obtained in a dark environment by additionally functioning as a transmissive display, a bright display can be achieved by a reflective display in a bright environment, and low electrical power consumption can be achieved by switching off the backlight.

In the first embodiment, since the color filter 104 is disposed between the transflective electrode 102 (See FIG. 1) and the liquid crystal layer 50, an electric field applied to the liquid crystal layer 50 is weakened by the transflective electrode 102. Therefore, in the first embodiment, a problem may occur in that a driving voltage is relatively larger or a liquid crystal is required to have a low threshold voltage. In contrast, in the second embodiment, since voltage is applied on the transparent electrode 107 which is formed above the color filter 104 (with the planarization film 106 therebetween), the problem in the first embodiment described above is solved.

Moreover, in the first embodiment, the transflective electrode 102 must be patterned in a form conforming to the driving method or the switching element to be used; however, in the second embodiment, the transflective film 122 is not necessarily patterned in a predetermined form. Instead, the transparent electrode 107 must be patterned in a form conforming to the driving method or the switching element to be used.

(Arrangement and Manufacturing Process for the Lower Substrate)

Figure 15A:
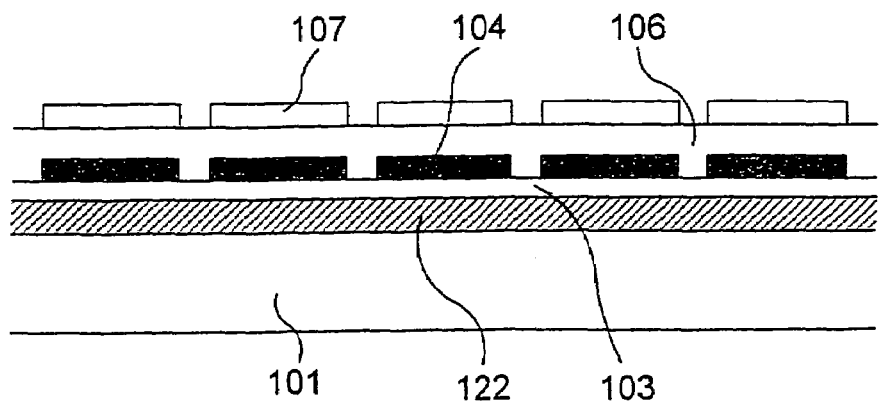
FIG. 15A is a cross-sectional view illustrating an example of a substrate structure of the second embodiment.

An arrangement and a manufacturing process for the substrate 101 will be explained, in which the transflective film 122, the protective film 103, and the color filter 104 are formed. FIG. 15A is a cross-sectional view showing an example of the arrangement of the substrate 101, in which the state of the arrangement being formed up to the transparent electrode 107 is shown. Aluminum or the like is used for the transflective film 122, similar to the transflective electrode 102 in the first embodiment. The protective film 103 and the color filter 104 are formed in the same manner described in the first embodiment.

The planarization film 106 composed of an organic film or the like serves to eliminate steps generated by the formation of the color filter 104 and to solve the problem of orientation defects when the liquid crystal device is arranged, whereby the planarization film 106 prevents image display from deterioration. When the problems described above are not issues, the planarization film 106 is not required. The transparent electrode 107 composed of ITO or the like is patterned in a predetermined form on the surface planarized by the planarization film 106.

Figure 15B:
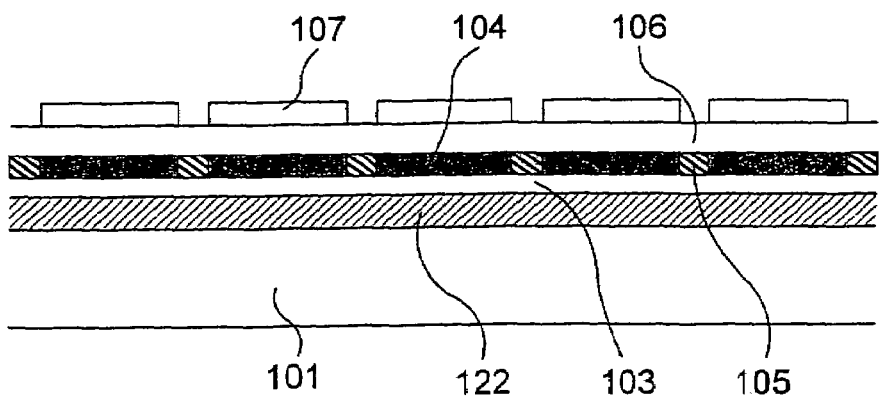
FIG. 15B is a cross-sectional view illustrating another example of a substrate structure of the second embodiment.

In the substrate 101, a shading layer 105 may be formed in the gaps between the color filters 104, as shown in FIG. 15B. In this embodiment of the arrangement, the planarization film 106 is formed to solve the problem of the steps caused by the color filter 104 and the shading layer 105.

In the arrangement shown in FIGS. 15A and 15B, the transparent electrodes 107 are patterned in a predetermined form and are applied to the liquid crystal devices of a passive matrix method or an active matrix method which uses a two-terminal switching element such as the TFD element 420 described above.

Figure 15C:
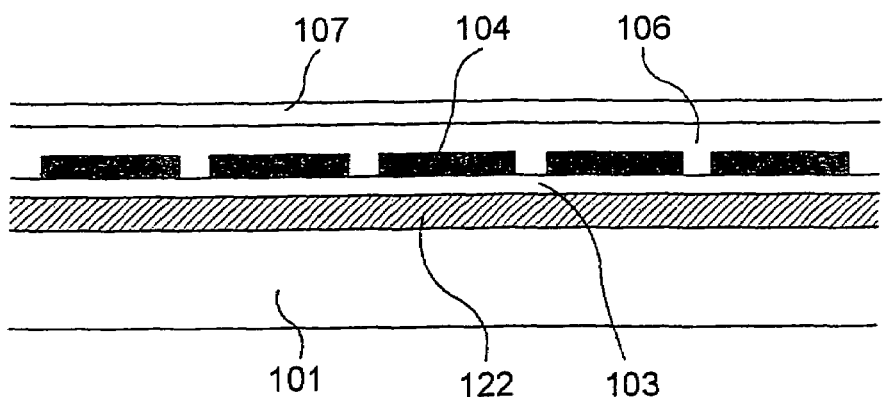
FIG. 15C is a cross-sectional view illustrating another example of a substrate structure of the second embodiment.
Figure 15D:
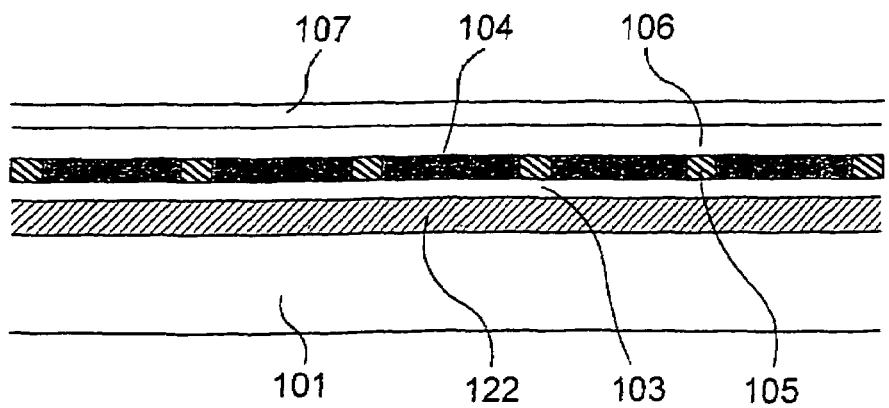
FIG. 15D is a cross-sectional view illustrating another example of a substrate structure of the second embodiment.
Figure 16A:
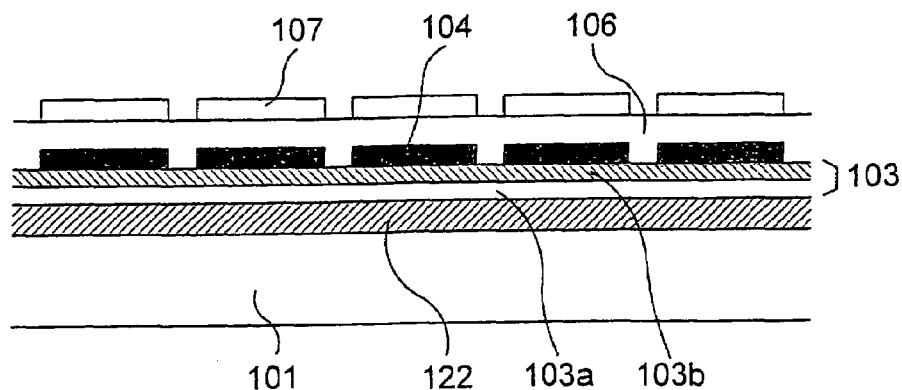
FIG. 16A is a cross-sectional view illustrating another example of a substrate structure of the second embodiment.
Figure 16B:
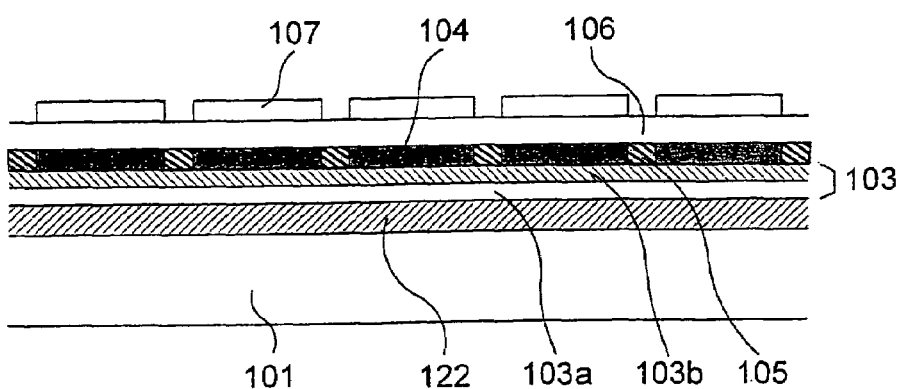
FIG. 16B is a cross-sectional view illustrating another example of a substrate structure of the second embodiment.
Figure 16C:
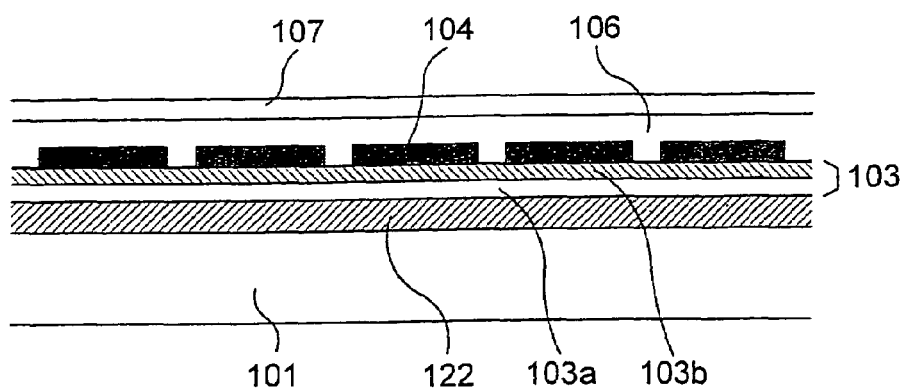
FIG. 16C is a cross-sectional view illustrating another example of a substrate structure of the second embodiment.
Figure 16D:
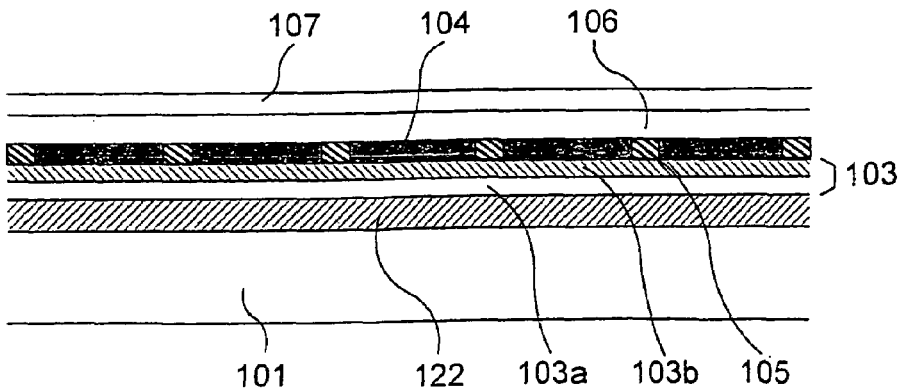
FIG. 16D is a cross-sectional view illustrating another example of a substrate structure of the second embodiment.

In the arrangement shown in FIGS. 15A and 15B, the transparent electrode 107 which is not patterned may be formed respectively as shown in FIGS. 15C and 15D. The above arrangement may be applied to the liquid crystal device of the active matrix method having a three-terminal switching element such as the TFT element 440 formed on the upper substrate 201 as described above.

Furthermore, the protective film 103 in FIGS. 15A to 15D may be composed of films 103a and 103b, as shown in FIGS. 3 and 5, an optionally combined film of an anodized film, a $SiO_2$ film, a $Si_3N_4$ film, and an organic dielectric film. These arrangements are shown in FIGS. 16A to 16D.

The orientation film 112 (See FIG. 14) is formed above the substrate shown in FIGS. 15A to 15D, and 16A to 16D, that is, the substrate 101 above which the color filter 104, shading layer 105, the planarization film 106 and the transparent electrode 107 are formed, and then the substrate is applied to the liquid crystal device.

Even though the shading layer 105 is omitted in FIG. 14, the shading layer 105 is preferably provided because it is effective for obtaining high contrast and for preventing the switching element from deterioration. In FIG. 15, the protective film 103 is a mono-layer film; however, similar to that described above, the protective film 103 may be composed by optionally laminating an anodized film, a $SiO_2$ film, a $Si_3N_4$ film, and an organic dielectric film. In the explanation described above, R (red), G (green), and B (blue) are used in the color filter 104; however, this is not so limited, three colors such as Y (yellow), M (magenta), and C (cyan) may also be used.

In the second embodiment, since the color filter 104 and the shading layer 105 are also separated from the transflective film 122 by the protective film 103, damage or deterioration of aluminum used as the transflective film 122 during the process for forming the color filter 104 and the shading layer 105 may be prevented beforehand by a simple process.

(Slit Provided at Transflective Film)

In the second embodiment, the transflective film 122 does not function as an electrode for the liquid crystal device, but only works to transmit and reflect light. Hence, when a slit is provided at the transflective film 122, compared to the first embodiment, restriction of the form of the slit is reduced. That is, since an electrode function of the liquid crystal device is performed by the transparent electrode 107 formed above the color filter 104, orientation defects in the liquid crystal are not generated regardless of the form of the slit in the transflective film 122. Furthermore, a position at which the slit is formed is not necessary to correspond to a pixel or a dot. Consequently, in this Embodiment, when the slit is formed, it is believed to be sufficient if the size of the slit is determined in terms of the area ratio relative to the transflective film 122 so that the slit cannot be seen with an naked eye. The area ratio and the size of the slit are as described in the first embodiment.

(Relationship between Shapes of Electrode and Positions of Color Filter to be Formed)

Next, in the second embodiment, the shapes of the transparent electrode 107 formed on the lower substrate 101 and the shapes of the transparent electrode 207 formed on the upper substrate 201 will be explained in conjunction with positions of the color filters 104 to be formed. In both cases of a passive matrix method and an active matrix method, the transflective electrode 102 of the first embodiment can be substituted by the transparent electrode 107 in the second embodiment. The concept of this substitution, in the liquid crystal device of an active matrix method, is similar to that of the combination of the switching element and the substrate on which the switching element is formed.

However, a point of difference between the second embodiment and the first embodiment is that the transparent electrode 107 functioning as an electrode of the liquid crystal device is formed after forming the color filter 104. That is, after forming the color filter 104 in a predetermined area, corresponding to the area thereof, the transparent electrode 107 is formed in the form of stripes or rectangles as a pixel electrode. Accordingly, when a switching element is formed at the lower substrate 101, a manufacturing process after forming the color filter 104 is necessarily to be studied; otherwise, the switching element must be formed taking heat stability of the color filter 104 into consideration. In contrast, when a switching element is formed at the upper substrate 201, this consideration is not required, so that flexibility in the process for manufacturing the switching element can be enhanced. As described in the first embodiment, various switches such as the TFT element and the TFD element can be used as a switching element. Thus, when the liquid crystal device is driven by using a switching element, an ON pixel and an OFF pixel are separated electrically by the switching element, whereby superior contrast and response, and very fine display, can be obtained. Explanations of other matters are omitted, since they are similar to that in the first embodiment.

THIRD EMBODIMENT

Figure 17:
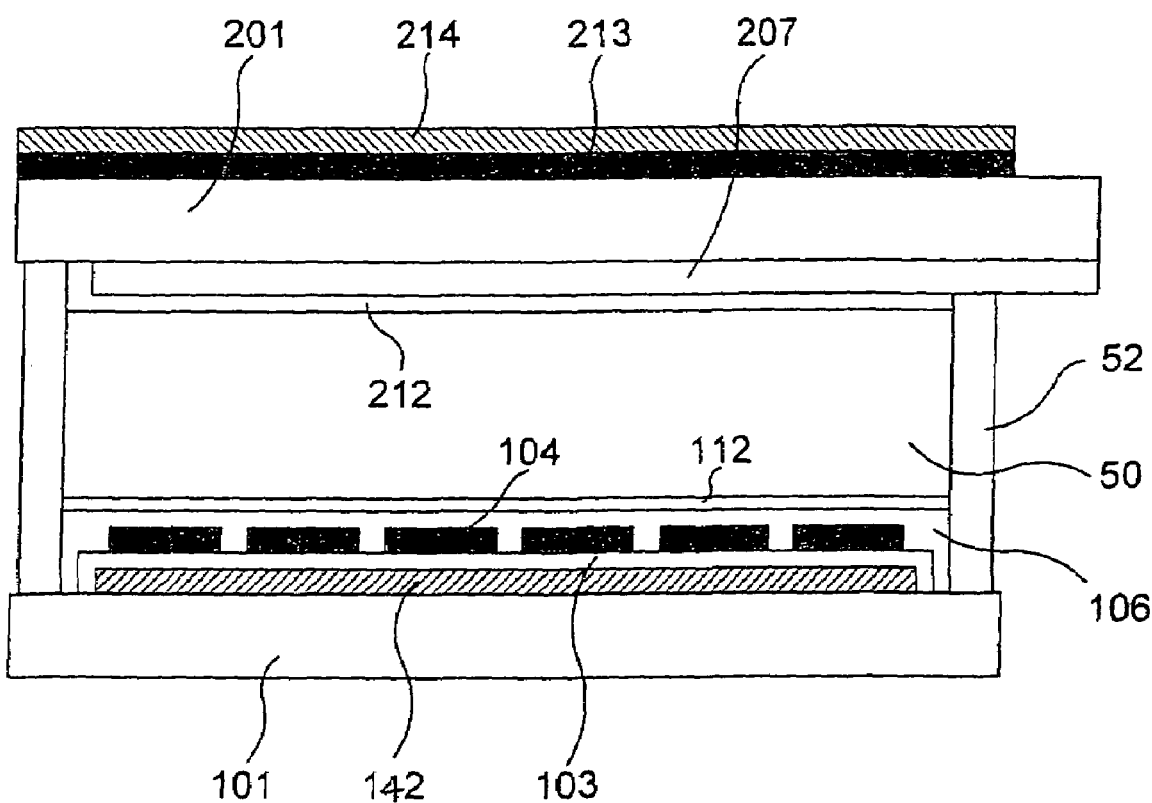
FIG. 17 is a schematic cross-sectional view showing an arrangement of a liquid crystal device according to a third embodiment.

Next, a liquid crystal device according to the third embodiment will be explained. The liquid crystal device is a reflective liquid crystal device. FIG. 17 is a schematic cross-sectional view showing an arrangement of this liquid crystal device. The point of difference between the liquid crystal device shown in this figure and that in the first embodiment shown in FIG. 1 is as described below. That is, first, the backlight used for the transmissive display is not provided since this liquid crystal device is a reflective display. Second, the transflective electrodes 102 formed on the inner surfaces of the lower substrates 101 in the first embodiment and the second embodiment are the transflective films; however, a reflective electrode 142 in the third embodiment works as a reflection film alone.

In the liquid crystal device above described, ambient light passes through the liquid crystal layer 50 and the color filter 104 after being transmitted through the polarizer 214 and the retardation film 213 sequentially, and is then reflected by the reflective electrode 142. The reflected light retraces its path through which light passed, whereby the light is emitted again at the polarizer 214. At this time, brightness when light passes through the polarizer 214 (bright state), brightness when light is absorbed (dark state), and intermediate brightness therebetween are controlled depending on an applied voltage on the liquid crystal layer 50.

According to the liquid crystal device of the reflective display, similar to the first embodiment and the second embodiment, light is transmitted through the colored layer, so that improvement in color reproducibility can be achieved. In addition, the distance from the transparent electrode 142 to the liquid crystal layer 50 is short, since the transparent electrode 142 is formed on the inner surface of the lower substrate 101, that is, on the surface adjacent to the liquid crystal layer. Hence, similar to the first embodiment, in the reflective display, generation of double images and blurred display caused by parallax can be avoided.

In the third embodiment, a metallic film including a primary component, such as aluminum, silver, chromium or the like, may be used as the reflective electrode 142 formed on the inner surface of the lower substrate. When a metallic film including aluminum as a primary component is used, the reflective electrode 142 is obtained by using an inexpensive material. In addition, in this case, since an oxide film can be formed from aluminum by anodization, the above oxide film can be used as a protective film 103. A preferable aluminum content in the metallic film is 85 weight percent or more.

A metallic film including silver as a primary component may be used as the reflective electrode 142. When a metallic film including silver as a primary component is used, a very high reflectance of the reflective electrode 142 can be obtained. In this case, a preferable silver content in the metallic film is 85 weight percent or more. However, in this case, $SiO_2$, $Si_3N_4$, or an organic dielectric film is to be used as a protective film 103 instead of the anodized film.

The reflective electrode 142 described above can be formed similar to the transflective electrode 102 as explained in FIGS. 2 to 5. The protective film 103, the color filter 104, etc., are the same as above. Accordingly, in the substrate 101 described above, since the color filter 104 is separated from the reflective electrode 142 by the protective film 103, damage or deterioration of aluminum, which is used as the reflective electrode 142, during the process for forming the color filter 104 can be prevented beforehand by a simple process.

Since the liquid crystal device in the third embodiment is the reflection type, transparency of the lower substrate 101 is not required. Hence, in addition to glass and plastic, materials such as a silicon substrate having dielectric films thereon may be used as a substrate 101.

In the third embodiment, concerning shapes of the reflective electrode 142 formed on the lower substrate 101 and shapes of the transparent electrode 207 formed on the upper substrate 201 in both cases of a passive matrix method and an active matrix method, the transflective electrode 102 of the first embodiment can be substituted by the transparent electrode 142 in the third embodiment. The concept of this substitution is similar to that of the combination of the switching element and the substrate on which the switching element is formed in the liquid crystal device of an active matrix method. As described in the first embodiment, various elements such as the TFT element and the TFD element can be used as a switching element. Thus, when the liquid crystal device is driven by using a switching element, an ON pixel and an OFF pixel are separated electrically by the switching element, whereby superior contrast and response, and very fine display, can be obtained. Explanations of other matters are omitted since they are similar to those in the first embodiment.

(Electronic Apparatus)

Next, an electronic apparatus provided with one of the liquid crystal devices described in the first embodiment to the third embodiment will be explained. Since the above-described liquid crystal devices shown in FIGS. 1, 14, and 17 can be used in various environments, and in addition can achieve low electrical power consumption, they are suitably applied to display portions of portable electronic apparatuses. Three embodiments of electronic apparatuses will be shown hereinafter.

Figure 18A:
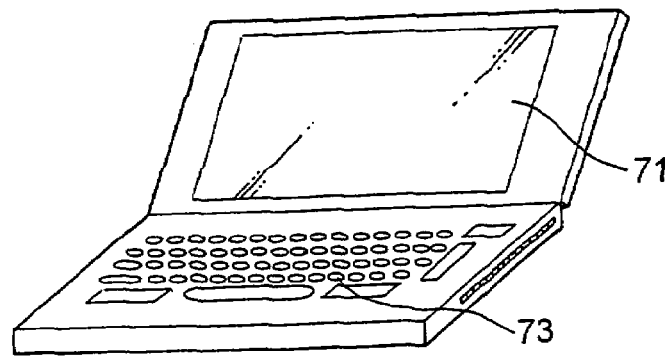
FIG. 18A is a schematic perspective view of a portable information device using a liquid crystal device according to the Embodiments.

FIG. 18A shows a portable information apparatus. The display portion 71 and the input portion 73 are provided at an upper part and at a lower part of the portable information apparatus body, respectively. A so-called "touch panel" is provided in a front face of the display portion 71 in many cases. An ordinary touch panel is difficult to see due to significant surface reflection of light. Accordingly, in the past, transmissive liquid crystal devices were used as display portions even for portable apparatuses in many cases. However, electrical power consumption by the transmissive liquid crystal device is large because a backlight is generally used, and battery life is therefore short. Even in the case described above, when the liquid crystal devices described in the first embodiment to the third embodiment are used as display portions 71 of portable information apparatuses, displays are bright and distinct, and low electrical power consumption can be achieved in both reflective and transflective types.

Figure 18B:
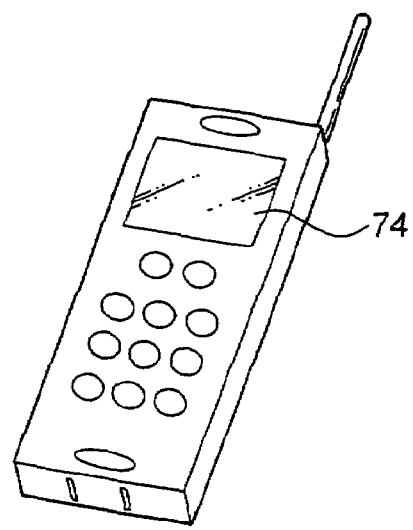
FIG. 18B is a schematic perspective view of a portable phone using a liquid crystal device according to the Embodiments.

FIG. 18B shows a mobile phone. A display portion 74 is provided at an upper part of the front face of the mobile phone body. Mobile phones are used in many environments, both indoors and outdoors. Mobile phones, in many cases, may be used specifically in cars; however, the interiors of cars at night are very dark. Accordingly, a liquid crystal device used for a mobile phone preferably primarily uses a reflective display with low electrical power consumption and, when necessary, additionally uses a transmissive display which can utilize light such as from a backlight. Consequently, when the liquid crystal device according to the first embodiment to the third embodiment is used as the display portion 74 for the mobile phone, a brighter and higher contrast ratio of the display compared to a conventional one can be obtained in both reflective display and transmissive display.

Figure 18C:
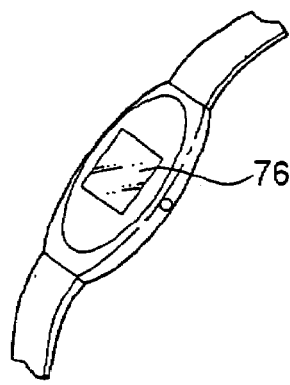
FIG. 18C is a schematic perspective view of a watch using a liquid crystal device according to the Embodiments.

FIG. 18C shows a watch. A display portion 76 is provided at the center of the watch body. An important point in application to watches is superior styling. When the liquid crystal device according to one of the embodiments of the first embodiment to the third embodiment is used as the display portion 76 for the watch, the coloration is reduced since characteristic changes by a wavelength of light is small. Hence, compared to a conventional watch, a display with remarkably superior styling can be obtained.

The liquid crystal device in the Embodiments according to the present invention is a display device which is capable of producing a high quality display regardless of the level of ambient light, and is also capable of being used as display portions for various electronic apparatuses. Electronic apparatuses to which the liquid crystal device as described can be applied are, for example, a liquid crystal television, a video tape recorder of the view-finder and the direct-viewing monitor types, a car navigation apparatus, an electronic calculator, a personal digital assistant (PDA), a pager, a word processor, a work station, a picture phone, a point-of-sale terminal, and apparatuses provided with touch panels.

The liquid crystal device according to the present invention is not limited to those described in the embodiments, and can be modified within the features or the spirit of the invention as claimed in the claims and as disclosed in the entire specification. The liquid crystal device according to the above modifications are also included in the technological scope of the present invention.

The invention claimed is:

1. A liquid crystal device comprising:
a first substrate and a second substrate;
a liquid crystal layer disposed between the first substrate and the second substrate;
a metallic film between the second substrate and the liquid crystal layer, the metallic film reflecting incident light from the first substrate for reflective display through the liquid crystal layer;
a protective layer disposed directly on the metallic film; and
a light-transmissive colored layer disposed directly on the protective layer, the colored layer is of a color selected from the group consisting of red, green, blue, yellow, magenta, and cyan, the colored layer colors the light reflected from the metallic film for colored reflective display.

2. A liquid crystal device according to claim 1, wherein the protective film includes an oxide film of the metallic film.

3. A method for manufacturing a liquid crystal device having:
a first substrate and a second substrate;
a liquid crystal layer disposed between the first substrate and the second substrate;
a metallic film formed on a surface of the second substrate adjacent to the liquid crystal layer reflecting incident light from the first substrate for reflective display through the liquid crystal layer; and
a light-transmissive colored layer disposed directly on a protective film, the colored layer is of a color selected from the group consisting of red, green, blue, yellow, magenta, and cyan, the colored layer colors the light reflected from the metallic film for colored reflective display; comprising the steps of:
forming the protective film directly on the metallic film; and
forming the colored layer directly on the protective film.

4. A method for manufacturing a liquid crystal device according to claim 3, wherein the step of forming the protective film includes a step of oxidizing the metallic film.

5. The method of claim 3, further comprising stacking the metallic film, the protective film, and the colored layer directly on top of each other.

* * * * *